(12) United States Patent
Khandekar et al.

(10) Patent No.: US 7,965,789 B2
(45) Date of Patent: Jun. 21, 2011

(54) REVERSE LINK POWER CONTROL FOR AN OFDMA SYSTEM

(75) Inventors: Aamod D. Khandekar, San Diego, CA (US); Alexei Y. Gorokhov, San Diego, CA (US); Arak Sutivong, Bangkok (TH); Murat Mese, Rancho Palos Verdes, CA (US)

(73) Assignee: Qualcomm Incorporated, San Diego, CA (US)

(*) Notice: Subject to any disclaimer, the term of this patent is extended or adjusted under 35 U.S.C. 154(b) by 979 days.

(21) Appl. No.: 11/507,781

(22) Filed: Aug. 21, 2006

(65) Prior Publication Data

US 2007/0041429 A1 Feb. 22, 2007

Related U.S. Application Data

(60) Provisional application No. 60/710,404, filed on Aug. 22, 2005, provisional application No. 60/756,816, filed on Jan. 5, 2006.

(51) Int. Cl.
  *H04K 1/02* (2006.01)
  *H04L 25/03* (2006.01)
  *H04L 25/49* (2006.01)

(52) U.S. Cl. .......... 375/297; 375/295; 455/91; 455/500; 455/522

(58) Field of Classification Search .......... 375/297, 375/295; 455/91, 500, 522
See application file for complete search history.

(56) References Cited

U.S. PATENT DOCUMENTS

| | | | | |
|---|---|---|---|---|
| 6,470,055 B1 * | 10/2002 | Feher | ............................ | 375/259 |
| 7,035,326 B1 | 4/2006 | Heidari et al. | | |
| 7,483,492 B2 * | 1/2009 | Feher | ............................ | 375/260 |

| | | | |
|---|---|---|---|
| 2002/0163974 A1 | 11/2002 | Friedman | |
| 2003/0036403 A1 | 2/2003 | Shiu et al. | |
| 2004/0179494 A1 | 9/2004 | Attar | |
| 2004/0193971 A1 | 9/2004 | Soong | |

(Continued)

FOREIGN PATENT DOCUMENTS

EP    1 467 498 A1    10/2004

(Continued)

OTHER PUBLICATIONS

International Search Report—PCT/US06/032894—International Search Authority, European Patent Office—Feb. 12, 2007.

(Continued)

*Primary Examiner* — Ted M Wang
(74) *Attorney, Agent, or Firm* — Dmitry R. Milikovsky; Howard H. Seo

(57) ABSTRACT

Techniques for performing power control of multiple channels sent using multiple radio technologies are described. The transmit power of a reference channel, sent using a first radio technology (e.g., CDMA), is adjusted to achieve a target level of performance (e.g., a target erasure rate) for the reference channel. The transmit power of a data channel, sent using a second radio technology (e.g., OFDMA), is adjusted based on the transmit power of the reference channel. In one power control scheme, a reference power spectral density (PSD) level is determined based on the transmit power of the reference channel. A transmit PSD delta for the data channel is adjusted based on interference estimates. A transmit PSD of the data channel is determined based on the reference PSD level and the transmit PSD delta. The transmit power of the data channel is then set to achieve the transmit PSD for the data channel.

42 Claims, 11 Drawing Sheets

U.S. PATENT DOCUMENTS

| | | | |
|---|---|---|---|
| 2005/0053031 A1 | 3/2005 | Holtzman et al. | |
| 2006/0019694 A1* | 1/2006 | Sutivong et al. | 455/522 |

FOREIGN PATENT DOCUMENTS

| | | |
|---|---|---|
| JP | 2001144680 | 5/2001 |
| JP | 2002539707 | 11/2002 |
| KR | 1020010013788 | 2/2001 |
| KR | 0417113 | 1/2002 |
| TW | 5305151 | 1/2003 |
| TW | 200305318 | 10/2003 |
| TW | 595146 | 6/2004 |
| TW | 200503449 | 1/2005 |
| TW | I231665 | 4/2005 |
| WO | 98/58461 A | 12/1998 |
| WO | 2004/025869 A2 | 3/2004 |
| WO | WO2004059874 | 7/2004 |
| WO | WO2005011145 A1 | 2/2005 |
| WO | WO2005048640 | 5/2005 |
| WO | 2006/007317 A | 1/2006 |
| WO | 2006/007318 A | 1/2006 |
| WO | 2006/122805 A | 11/2006 |

OTHER PUBLICATIONS

Taiwanese Search report—095130825—TIPO—Nov. 2, 2011.
Written Opinion—PCT/US06/032894—International Search Authority, European Patent Office—Feb. 12, 2007.

* cited by examiner

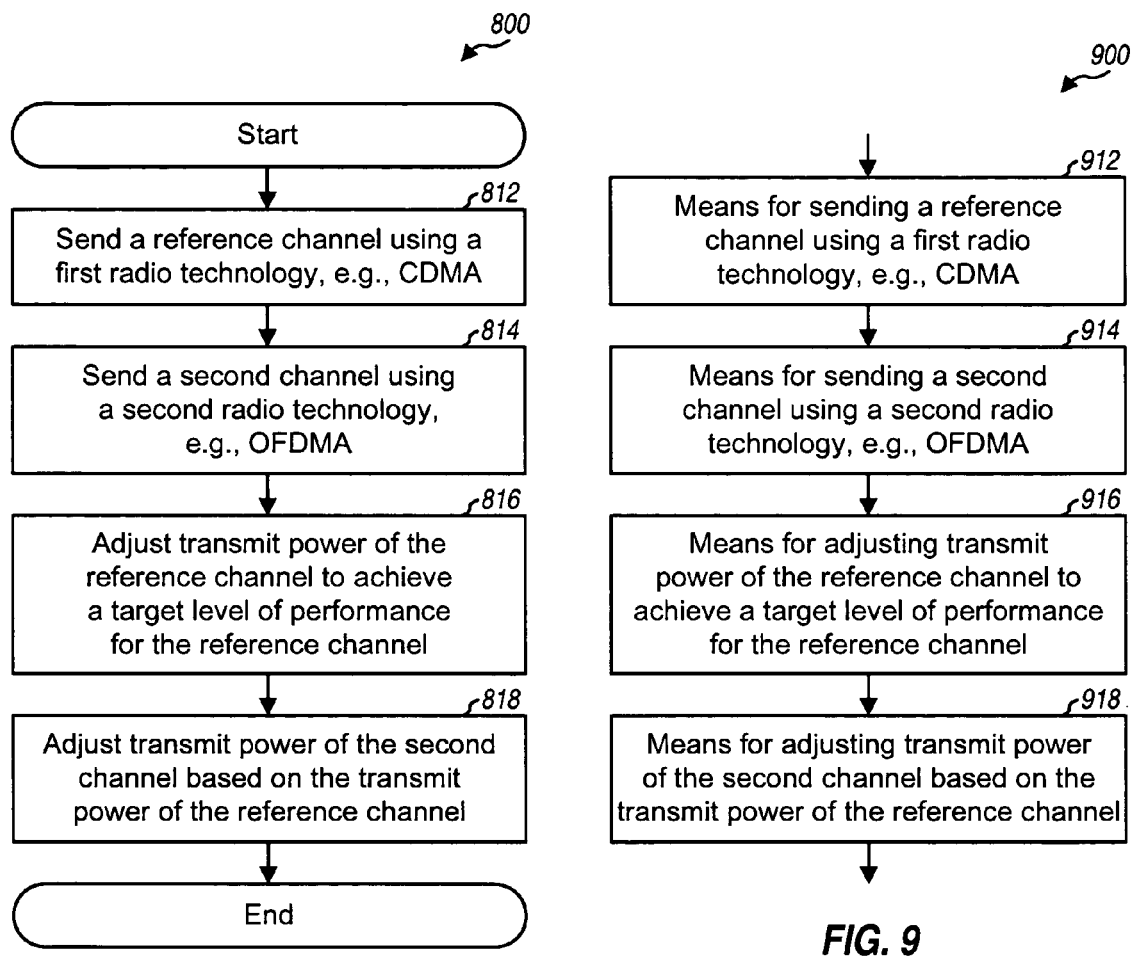

REVERSE LINK POWER CONTROL FOR AN OFDMA SYSTEM

The present application claims priority to provisional U.S. Application Ser. No. 60/710,404, entitled "UP LINK POWER CONTROL FOR OFDMA SYSTEMS," filed Aug. 22, 2005, and U.S. Provisional Patent Application No. 60/756,816, entitled "UP LINK POWER CONTROL FOR OFDMA SYSTEMS," filed Jan. 5, 2006, both of which are assigned to the assignee hereof and incorporated herein by reference.

BACKGROUND

I. Field

The present disclosure relates generally to communication, and more specifically to power control in a wireless communication system.

II. Background

A wireless multiple-access communication system can communicate with multiple terminals on the forward and reverse links. The forward link (or downlink) refers to the communication link from the base stations to the terminals, and the reverse link (or uplink) refers to the communication link from the terminals to the base stations.

Multiple terminals may simultaneously receive data on the forward link and/or transmit data on the reverse link. This may be achieved by multiplexing the transmissions on each link to be orthogonal to one another in time, frequency and/or code domain. On the reverse link, complete orthogonality, if achieved, results in the transmission from each terminal not interfering with the transmissions from other terminals at a receiving base station. However, complete orthogonality among the transmissions from different terminals is often not realized due to channel conditions, receiver imperfections, and so on. The loss in orthogonality results in each terminal causing some amount of interference to other terminals communicating with the same base station. Furthermore, the transmissions from terminals communicating with different base stations are typically not orthogonal to one another. Thus, each terminal may also cause interference to other terminals communicating with nearby base stations. The performance of each terminal is degraded by the interference from all other terminals in the system.

There is therefore a need in the art for techniques to control the transmit power of the terminals to reduce interference and achieve good performance for all terminals.

SUMMARY

Techniques for controlling transmit power of control and data channels in a wireless communication system are described herein. In one aspect, power control (PC) is performed for a reference channel sent using a first radio technology as well as a second channel sent using a second radio technology. The reference channel may be a control channel carrying signaling and may be sent using Code Division Multiple Access (CDMA). The second channel may be a data channel carrying traffic data and may be sent using Orthogonal Frequency Division Multiple Access (OFDMA). The transmit power of the reference channel is adjusted to achieve a target level of performance for the reference channel, which may be quantified by a target erasure rate. The transmit power of the second channel is adjusted based on the transmit power of the reference channel.

In another aspect, power control is performed for a control channel, e.g., an acknowledgement (ACK) channel, without using explicit feedback for the control channel. A reference transmit power level, which may be the transmit power of the reference channel, is determined. Errors in signaling sent on the control channel are detected, e.g., implicitly without receiving feedback indicating the errors. The signaling may be ACKs, and the errors in the ACKs sent on the control channel may be detected based on data packets received on a data channel. The transmit power of the control channel is adjusted based on the reference transmit power level and the detected errors on the control channel.

In yet another aspect, power control is performed for a data channel. A reference power spectral density (PSD) level is determined, e.g., based on the transmit power of the reference channel. A transmit PSD delta for the data channel is adjusted, e.g., based on interference estimates. A transmit PSD of the data channel is determined based on the reference PSD level and the transmit PSD delta. The transmit power of the data channel may then be determined based on the transmit PSD and the number of subcarriers used for the data channel.

Various aspects and embodiments of the disclosure are described in further detail below.

BRIEF DESCRIPTION OF THE DRAWINGS

The features and nature of the present disclosure will become more apparent from the detailed description set forth below when taken in conjunction with the drawings in which like reference characters identify correspondingly throughout.

FIGS. 8 and 9 show a process and an apparatus, respectively, for performing power control in a system utilizing multiple radio technologies.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
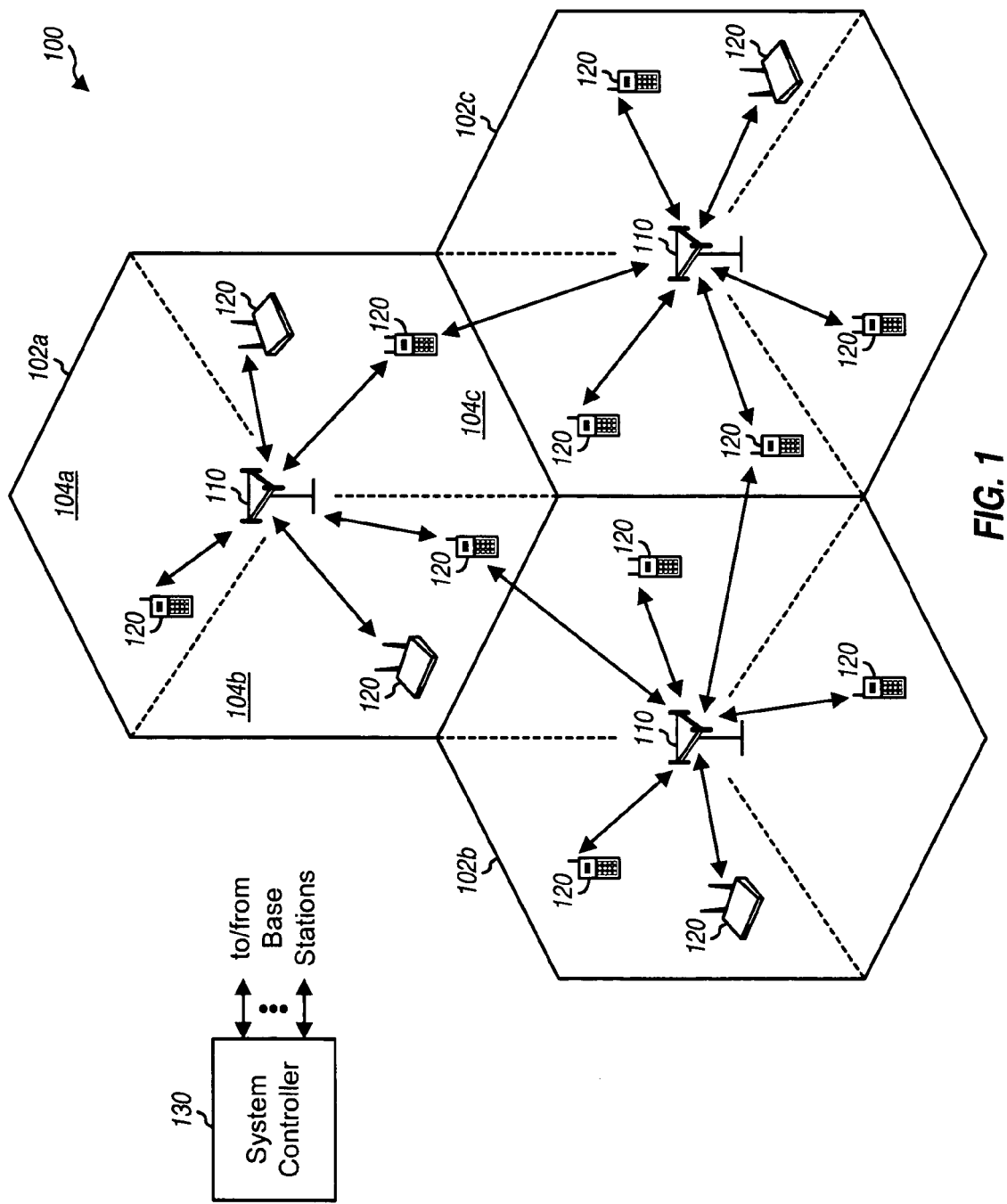
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called, and may contain some or all of the functionality of, an access terminal, a mobile station, a user equipment, and/or some other entity. A terminal may be a wireless device, a cellular phone, a personal digital assistant (PDA), a wireless modem, a handheld device, and so on. A terminal may communicate with zero, one, or multiple base stations on the forward and/or reverse link at any given moment.

For a centralized architecture, a system controller 130 couples to base stations 110 and provides coordination and control for these base stations. System controller 130 may be a single network entity or a collection of network entities. For a distributed architecture, the base stations may communicate with one another as needed.

The power control techniques described herein may be used for a system with sectorized cells as well as a system with un-sectorized cells. For clarity, the techniques are described below for a system with sectorized cells. In the following description, the terms "base station" and "sector" are used interchangeably, and the terms "terminal" and "user" are also used interchangeably.

The power control techniques described herein may also be used for various wireless communication systems and various radio technologies such as Orthogonal Frequency Division Multiple Access (OFDMA), Single-Carrier Frequency Division Multiple Access (SC-FDMA), Code Division Multiple Access (CDMA), Time Division Multiple Access (TDMA), Frequency Division Multiple Access (FDMA), and so on. OFDMA and SC-FDMA partition a frequency band (e.g., the system bandwidth) into multiple orthogonal subcarriers, which are also called tones, bins, and so on. Each subcarrier may be modulated with data. In general, modulation symbols are sent in the frequency domain with OFDMA and in the time domain with SC-FDMA. The techniques may also be used for wireless communication systems that utilize multiple radio technologies. For clarity, the techniques are described below for a system that utilizes OFDMA for data channels and CDMA for some control channels.

Figure 2:
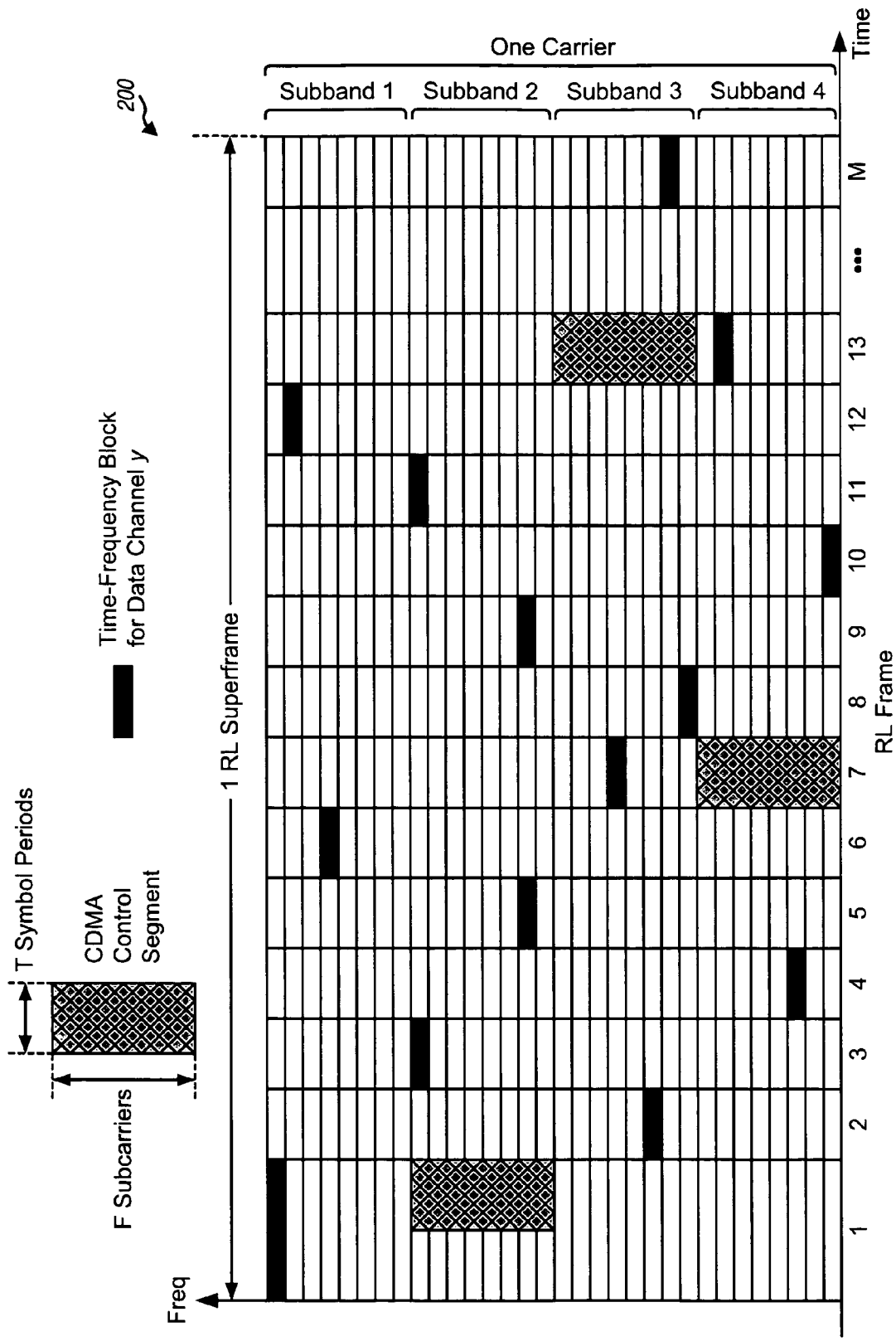
FIG. 2 shows an exemplary superframe structure.

FIG. 2 shows an exemplary superframe structure 200 that may be used for the reverse link in system 100. The transmission timeline for the reverse link is partitioned into units of superframes. Each superframe spans a fixed or configurable time duration and includes M frames, where M>1. Each frame may carry traffic data and/or signaling. The superframe structure for the forward link may be the same as or different from the superframe structure for the reverse link.

FIG. 2 also shows an embodiment of a CDMA control segment for one carrier that is partitioned into four subbands. In this embodiment, the CDMA control segment carries certain types of signaling and is sent on one subband in every $6^{th}$ frame. A CDMA frame is a frame in which the CDMA control segment is sent. The CDMA control segment is mapped to a time-frequency region that covers F subcarriers and spans T symbol periods, where F and T may each be any integer value. In general, the CDMA control segment may be sent at any rate and in a time-frequency region of any dimension. The CDMA control segment may hop across frequency, as shown in FIG. 2, or may be static in frequency.

FIG. 2 also shows an exemplary frequency-hopping scheme for data channels. A data channel is a means for sending data from a transmitter to a receiver and may also be called a traffic channel, a physical channel, and so on. Each data channel may be mapped to a specific sequence of time-frequency blocks that hop across frequency in different frames to achieve frequency diversity, as shown in FIG. 2. In an embodiment, the frequency hopping for the data channels avoids the CDMA control segment. A set of subcarriers may be allocated for the CDMA control segment. Each data channel that collides with the CDMA control segment may be mapped to the subcarrier set allocated to the CDMA control segment.

Various control channels may be defined and used to carry various types of signaling on the reverse link. The reverse link control channels may include the following:

ACK channel—carry ACKs for data packets received on the forward link,
CQI channel—carry forward link signal quality information,
Request channel—carry requests for resources on the reverse link,
Pilot channel—carry a broadband pilot for the reverse link, and
Access channel—carry access probes for accessing the system.

Different and/or additional control channels may also be sent on the reverse link.

In general, various channel structures may be used to send traffic data and signaling. In an embodiment that is described below, on the reverse link, OFDMA is used for data channels carrying traffic data, and CDMA is used for most of the control channels. In an embodiment, the CDMA control segment carries the CQI, Request, Pilot, and Access channels, and the ACK channel is sent along with a reverse link data channel. The control channels may also be sent in other manners.

Figure 3:
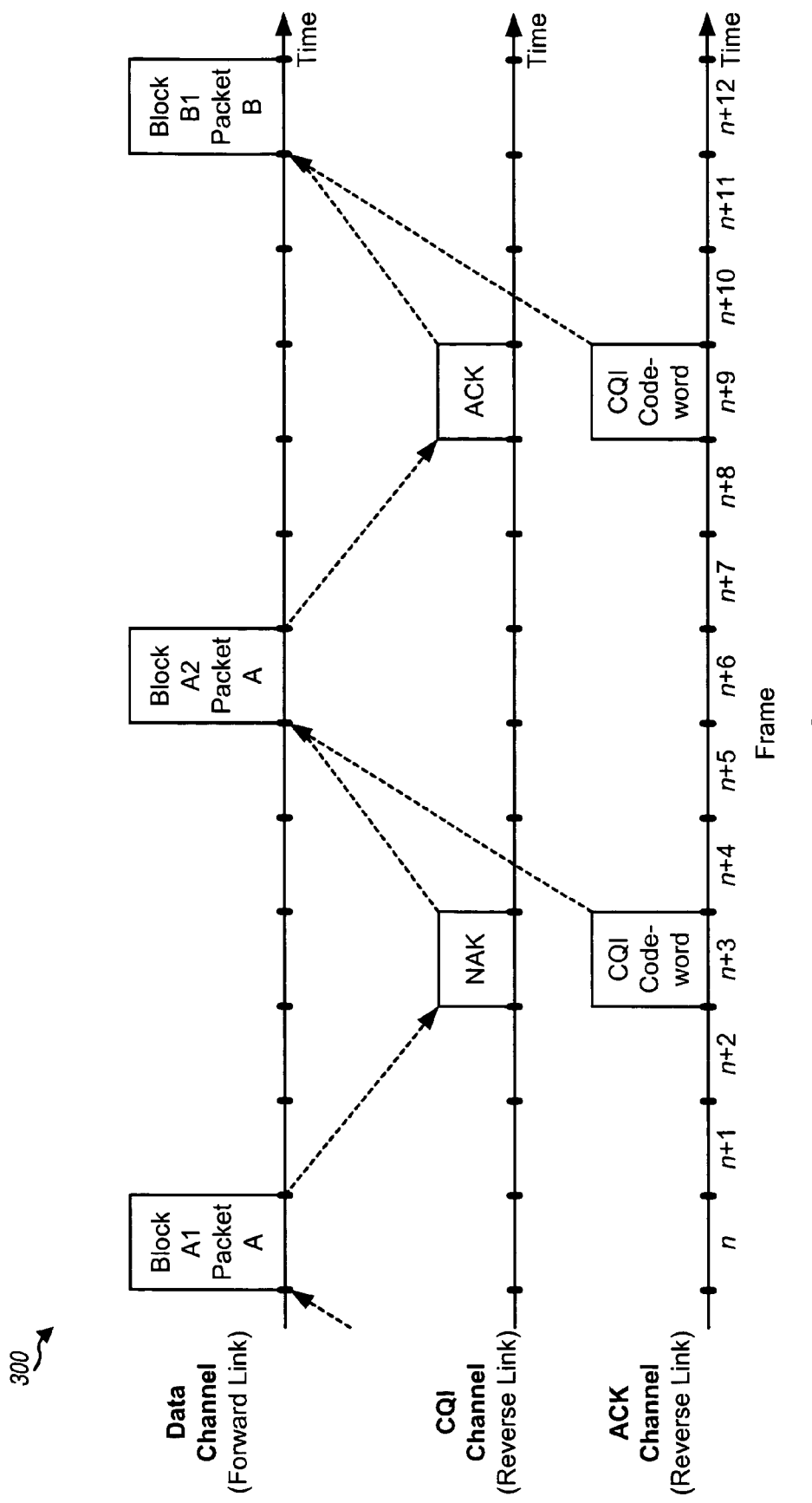
FIG. 3 shows an H-ARQ transmission scheme for the forward link.

FIG. 3 shows an exemplary hybrid automatic retransmission request (H-ARQ) transmission scheme 300 for the forward link in system 100. A terminal measures the received signal quality of the forward link for a base station, generates a channel quality indication (CQI) report, maps the CQI report to a codeword, and transmits the codeword on the CQI channel (not shown in FIG. 3). Signal quality may be quantified by a signal-to-noise ratio (SNR), a signal-to-noise-and-interference ratio (SINR), a carrier-to-interference ratio (C/I), an energy-per-symbol-to-noise ratio (Es/No), and so on. For clarity, SNR is used to denote signal quality in the description below.

The base station receives the CQI codeword from the terminal and selects a packet format (e.g., a data rate, packet size, and so on) to use for data transmission to the terminal. The base station then processes (e.g., encodes and modulates) a data packet (Packet A) in accordance with the selected packet format and generates multiple data blocks for the packet. Each data block may contain sufficient information to allow the terminal to correctly decode the packet under favorable channel conditions. The multiple data blocks typically contain different redundancy information for the packet and may be sent one block at a time until the packet is terminated. Each block transmission is also referred to as a H-ARQ attempt. Each block transmission after the first block is also referred to as a retransmission.

The base station transmits the first data block (Block A1) of Packet A in frame n. The terminal receives and processes (e.g., demodulates and decodes) Block A1, determines that Packet A is decoded in error, and sends a negative acknowledgment (NAK) on the ACK channel in frame n+3. The base station receives the NAK and transmits the second data block (Block A2) of Packet A in frame n+6. The terminal receives Block A2, processes Blocks A1 and A2, determines that Packet A is decoded correctly, and sends an ACK in frame n+9. The base station receives the ACK and terminates the transmission of Packet A. The base station processes the next data packet (Packet B) and transmits the data blocks of Packet B in similar manner.

FIG. 3 shows a specific embodiment of transmitting data blocks, CQI, and ACK/NAK. In this embodiment, traffic data is sent in every $6^{th}$ frame, a CQI report is also sent in every $6^{th}$ frame, and an ACK is sent if a packet is decoded correctly. The data and signaling may also be sent in other manners, e.g., at different rates, with different interval between block transmissions, with different delay for the ACK/NAK, and so on. For example, a CQI report may be sent every q CDMA frames, where q may be any positive integer value.

For clarity, FIG. 3 shows transmission of both NAKs and ACKs on the ACK channel. For an ACK-based scheme, an ACK is sent if a packet is decoded correctly, and NAKs are not sent and are presumed by the absence of ACKs. For a NAK-based scheme, a NAK is sent if a packet is decoded in error, and ACKs are not sent. For clarity, the following description assumes the use of an ACK-based scheme, and only ACKs are sent for packets decoded correctly.

The data channels are sent using OFDMA and are orthogonal to one another in frequency. In general, the data channels minimally interfere with one another at a receiving base station, and there is little intra-sector interference among users transmitting on these data channels. Consequently, users located closer to the base station (or "interior" users) may potentially be received at higher power spectral density (PSD) with little impact to other users in the same sector because their data channels are orthogonal to one another and there is no "near-far" effect. The interior users may also have small impact on users in other sectors because of higher path losses to the neighbor base stations. A goal of reverse link power control is to maximize data capacity under complexity, overhead and stability constraints.

In an aspect, closed-loop power control is performed for a reference channel, and power control for other data and control channels is referenced to the reference channel. The reference channel may be any channel that is sent at a sufficient rate to allow for reliable adjustment of the transmit power of the reference channel. In an embodiment that is described below, the reference channel is the CQI channel, which has a relatively constant low data rate as shown in FIG. 3.

1. Power Control for CQI Channel

A CQI report or signaling to be sent on the CQI channel in a given frame n may be a small word containing L bits, where in general L≧1 and, e.g., L=10. This word may be mapped to one of $2^L$ possible codewords in a codebook. The codeword is then sent on the CQI channel in frame n. The same number of bits (e.g., L bits) may be sent for each CQI report. In this case, the same codebook may be used for each CQI report. Alternatively, different numbers of bits may be sent for different CQI reports, and different codebooks may be used depending on the number of bits being sent. The codewords in a given codebook may be generated based on a block code or some other mapping scheme. In an embodiment, the $2^L$ possible codewords correspond to $2^L$ Walsh codes of length $2^L$.

A base station receives the codewords sent on the CQI channel. The base station performs the complementary decoding on each received codeword to obtain a decoded word, which is a word deemed most likely to have been sent for the received codeword. The decoding may be performed in various manners. In an embodiment, the base station computes a Euclidean distance between the received codeword and each of the $2^L$ possible valid codewords in the codebook. The valid codeword with the shortest Euclidean distance to the received codeword may be deemed as the transmitted codeword. The word corresponding to this valid codeword may be provided as the decoded word.

An error detection code may not be used for the CQI channel, e.g., because of the small word size. In this case, there is no direct way to determine whether the decoding of a given received codeword is correct or in error, and that the decoded word is indeed the transmitted word. A metric may be defined and used as an indication of the confidence in the decoding result. In an embodiment, the metric is defined as:

$$M(n) = \frac{d_1(n)}{d_2(n)}, \quad \text{Eq (1)}$$

where $d_1(n)$ is the Euclidean distance between the received codeword in frame n and the nearest valid codeword,
$d_2(n)$ is the Euclidean distance between the received codeword in frame n and the next nearest valid codeword, and
M(n) is the metric for the received codeword in frame n.

If the received codeword is much closer to the nearest valid codeword than the next nearest valid codeword, then metric M(n) is a small value and there is high degree of confidence that the decoded word is correct. Conversely, if the received codeword has approximately equal distance to the nearest valid codeword and the next nearest valid codeword, then metric M(n) approaches one, and there is less confidence that the decoded word is correct.

The metric in equation (1) may be used for erasure detection, which is determining whether the decoding of a given received codeword is correct or in error. Other metrics may also be used for erasure detection. In general, a metric may be defined based on any reliability function $f(r, C)$, where r is a received codeword and C is a codebook of all possible codewords. The function $f(r, C)$ should be indicative of the quality/reliability of the received codeword and should have the proper characteristics, e.g., monotonic with detection reliability.

The base station may perform erasure detection to determine whether the decoding result for a received codeword meets a desired level of confidence. The base station may compute the metric for the received codeword, compare the metric against an erasure threshold, and declare the received codeword to be "erased" or "non-erased", as follows:

If $M(n) < TH_{erasure}$, then declare a non-erased codeword,  Eq (2)

If $M(n) \geq TH_{erasure}$, then declare an erased codeword, where $TH_{erasure}$ is the threshold used for erasure detection. In general, the erasure detection is dependent on how the metric is defined and may be different from equation (2) for other metrics.

The probability of declaring a received codeword as an erased codeword is called an erasure rate. The erasure rate is dependent on various factors such as the threshold used for erasure detection and the received SNR of the received codeword. For a given received SNR, a lower erasure threshold increases the likelihood of a received codeword being declared an erased codeword, and vice versa. For a given erasure threshold, a lower received SNR increases the likelihood of a received codeword being declared an erased codeword, and vice versa.

The transmit power of the CQI channel may be adjusted in various manners. In one embodiment, which is referred to as an "up-down" PC scheme, a base station measures the received SNR of the CQI channel and sends PC bits or PC commands to direct a terminal to adjust the transmit power of the CQI channel. In another embodiment, which is referred to as an "erasure-based" PC scheme, the base station sends CQI erasure indication (CEI) bits or erasure indications that indicate the results of the erasure detection at the base station. The terminal adjusts the transmit power of the CQI channel based on the CEI bits. For both PC schemes, the transmit power of the CQI channel may be adjusted such that the CQI channel can achieve the desired level of performance, which may be quantified by a target erasure rate and/or some other measures.

Figure 4:
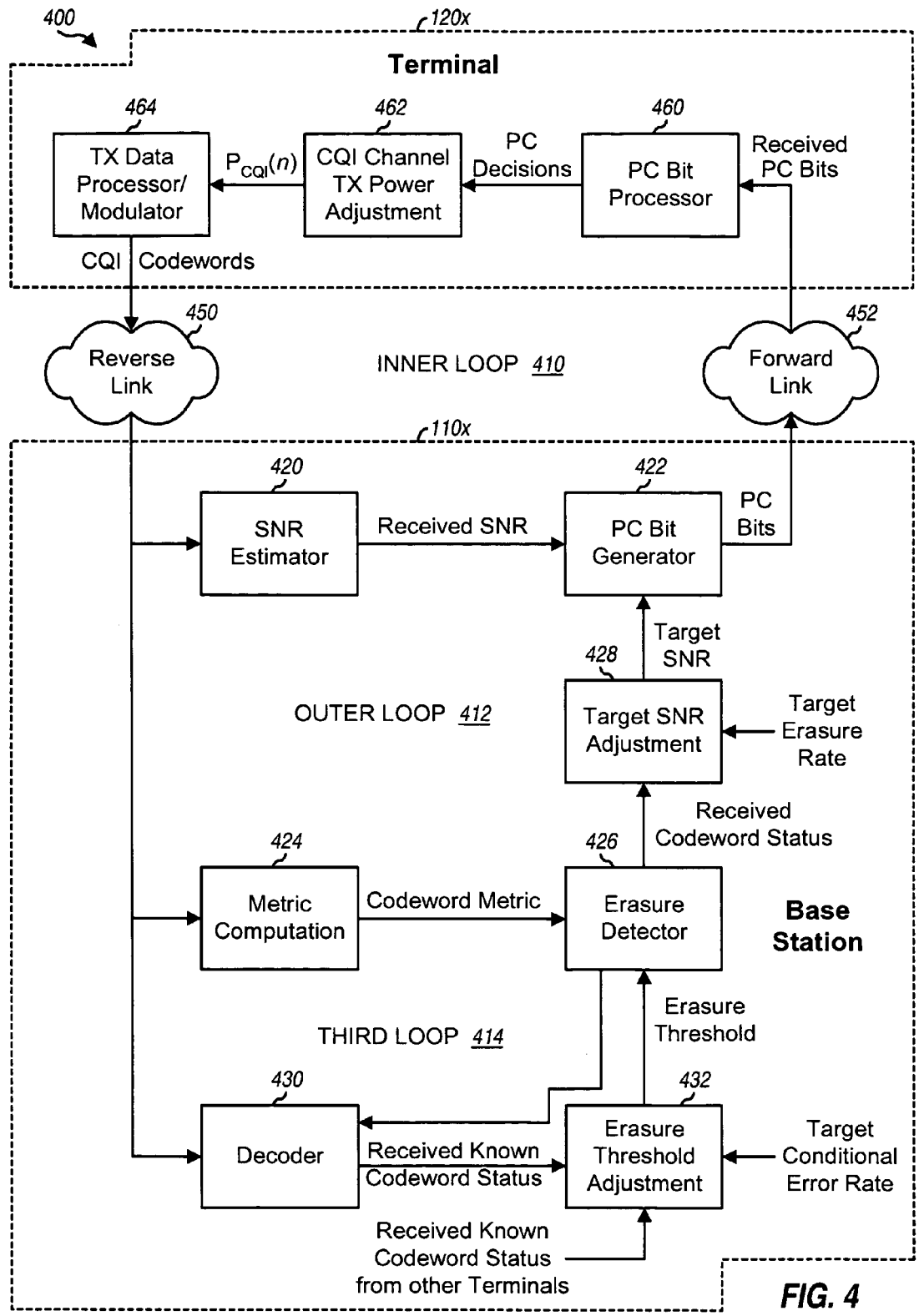
FIG. 4 shows a power control mechanism for an up-down PC scheme.

FIG. 4 shows an embodiment of a power control mechanism 400 that implements the up-down PC scheme for the CQI channel. Power control mechanism 400 includes an inner loop 410, an outer loop 412, and a third loop 414. Inner loop 410 operates between a base station 110x and a terminal 120x. Outer loop 412 and third loop 414 are maintained by base station 110x. Base station 10x may be any one of base stations 110 in FIG. 1, and terminal 120x may be any one of the terminals 120 in FIG. 1.

Inner loop 410 adjusts the transmit power of the CQI channel to maintain the received SNR of the CQI channel at or near a target SNR. For inner loop 410, an SNR estimator 420 at base station 110x estimates the received SNR of the CQI channel and provides the received SNR to a PC bit generator 422. PC bit generator 422 also receives the target SNR for the CQI channel, compares the received SNR against the target SNR, and generates PC bits based on the comparison results. Each PC bit may be either (1) an UP command to direct an increase in transmit power of the CQI channel or (2) a DOWN command to direct a decrease in transmit power. Base station 110x transmits the PC bits on the forward link (cloud 452) to terminal 120x.

At terminal 120x, a PC bit processor 460 receives the PC bits sent by base station 110x and makes a decision on each received PC bit. A PC decision may be either an UP decision if the received PC bit is deemed to be an UP command or a DOWN decision if the received PC bit is deemed to be a DOWN command. A unit 462 may adjust the transmit power of the CQI channel based on the PC decisions from processor 460, as follows:

$$P_{CQI}(n+1) = \begin{cases} P_{CQI}(n) + \Delta P_{CQI} & \text{for an UP decision,} \\ P_{CQI}(n) - \Delta P_{CQI} & \text{for a DOWN decision,} \end{cases} \quad \text{Eq (3)}$$

where $P_{CQI}(n)$ is the transmit power of the CQI channel in update interval n, and
$\Delta P_{CQI}$ is a step size for the transmit power of the CQI channel.

The transmit power $P_{CQI}(n)$ and the step size $\Delta P_{CQI}$ are given in units of decibels (dB). In the embodiment shown in equation (3), the transmit power is increased or decreased by the same step size, e.g., 0.5 dB, 1.0 dB, or some other value, which may be selected to provide good performance for the CQI channel. In another embodiment, the transmit power is adjusted by different up and down step sizes. The transmit power $P_{CQI}(n)$ may also be maintained at the same level if a received PC bit is deemed to be too unreliable. A transmit (TX) data processor/modulator 464 generates CQI codewords and transmits these codewords at transmit power of $P_{CQI}(n)$ on the CQI channel via the reverse link (cloud 450) to base station 110x.

Outer loop 412 adjusts the target SNR based on received codewords such that the target erasure rate is achieved for the CQI channel. At base station 110x, a metric computation unit 424 computes the metric M(n) for each codeword received on the CQI channel, e.g., as shown in equation (1). An erasure detector 426 performs erasure detection for each received codeword based on the metric M(n) and the erasure threshold, e.g., as shown in equation (2). A target SNR adjustment unit 428 obtains the status of each received codeword (either erased or non-erased) and may adjust the target SNR of the CQI channel, as follows:

$$SNR_{target}(k+1) = \begin{cases} SNR_{target}(k) + \Delta SNR_{up}, & \text{for an erased } codeword \\ SNR_{target}(k) - \Delta SNR_{dn}, & \text{for a non-erased } codeword, \end{cases} \quad \text{Eq (4)}$$

where $\Delta SNR_{target}(k)$ is the target SNR of the CQI channel in update interval k,
$\Delta SNR_{up}$ is an up step size for the target SNR, and
$\Delta SNR_{dn}$ is a down step size for the target SNR.
The target SNR and the up and down step sizes are given in units of dB.
The $\Delta SNR_{up}$ and $\Delta SNR_{dn}$ step sizes may be set as follows:

$$\Delta SNR_{up} = \Delta SNR_{dn} \cdot \left(\frac{1 - Pr_{erasure}}{Pr_{erasure}}\right), \quad \text{Eq (5)}$$

where $Pr_{erasure}$ is the target erasure rate. For example, if the target erasure rate for the CQI channel is 10%, then the up step size is 9 times the down step size. If the up step size is 0.5 dB, then the down step size is approximately 0.056 dB.

In an embodiment, the erasure threshold is adjusted to achieve a target conditional error rate $Pr_{error}$ for the CQI channel. The conditional error rate is the probability of error conditioned on non-erased codewords, which means the following: given that a received codeword is declared to be a non-erased codeword, the probability of the received codeword being decoded in error is $Pr_{error}$. A low $Pr_{error}$ (e.g., 1% or 0.1%) corresponds to high degree of confidence in the decoding result when a non-erased codeword is declared.

Third loop 414 adjusts the erasure threshold based on received known codewords such that the target conditional error rate is achieved for the CQI channel. Terminal 120x may transmit a known codeword on the CQI channel periodically or whenever directed. At base station 110x, metric computation unit 424 and erasure detector 426 perform erasure detection for each received known codeword in the same manner as for other received codewords. Erasure detector 426 provides the status of each received known codeword. A decoder 430 decodes each received known codeword deemed to be non-erased and provides the codeword status, which may be: (1) erased, (2) "good" if the received known codeword is non-erased and decoded correctly, or (3) "bad" if the received known codeword is non-erased but decoded in error. An erasure threshold adjustment unit 432 may adjust the erasure threshold based on the status of the received known codewords, as follows:

$$TH_{erasure}(\ell+1) = \qquad \text{Eq. (6)}$$
$$\begin{cases} TH_{erasure}(\ell) + \Delta TH_{up}, & \text{for a good } codeword, \\ TH_{erasure}(\ell) - \Delta TH_{dn}, & \text{for a bad } codeword, \text{ and} \\ TH_{erasure}(\ell), & \text{for an erased } codeword, \end{cases}$$

where $\Delta TH_{erasure}(l)$ is the erasure threshold for the CQI channel in update interval l;

$\Delta TH_{up}$ is an up step size for the erasure threshold; and $\Delta TH_{dn}$ is a down step size for the erasure threshold.

In the embodiment shown in equation (6), the erasure threshold is decreased by $\Delta TH_{dn}$ for each received known codeword that is "bad". The lower erasure threshold corresponds to a more stringent erasure detection criterion and results in a received codeword being more likely to be deemed erased, which in turn results in the received codeword being more likely to be decoded correctly when deemed to be non-erased. The erasure threshold is increased by $\Delta TH_{up}$ for each received known codeword that is "good" and is maintained for received known codewords that are erased.

The $\Delta TH_{up}$ and $\Delta TH_{dn}$ step sizes may be set as follows:

$$\Delta TH_{dn} = \Delta TH_{up} \cdot \left( \frac{1 - Pr_{error}}{Pr_{error}} \right). \qquad \text{Eq (7)}$$

For example, if the target conditional error rate for the control channel is 1%, then the down step size is 99 times the up step size. The magnitude of $\Delta TH_{up}$ and $\Delta TH_{dn}$ may be selected based on the desired convergence rate for the third loop and/or other factors.

The erasure rate, conditional error rate, erasure threshold, and received SNR are typically related. For a given erasure threshold and a given received SNR, there exist a specific erasure rate and a specific conditional error rate. By changing the erasure threshold via third loop 414, a trade off may be made between the erasure rate and the conditional error rate.

In general, the adjustment of the erasure threshold is dependent on the metric used for erasure detection. Equations (6) and (7) are based on the metric shown in equation (2). Other metrics may also be used for erasure detection, and the adjustment of the erasure threshold may be modified accordingly.

The erasure threshold may be adjusted in various manners. In one embodiment, base station 110x maintains a separate third loop for each terminal and adjusts the erasure threshold to achieve the desired performance for that terminal. In another embodiment, base station 110x maintains a single third loop for all terminals and adjusts the erasure threshold based on known codewords received from these terminals to achieve good performance for all terminals. In yet another embodiment, base station 110x maintains a single third loop for each group of terminals having similar performance and adjusts the erasure threshold based on known codewords received from all terminals in the group.

Inner loop 410, outer loop 412, and third loop 414 may operate at different rates. Inner loop 410 is typically the fastest loop, and the transmit power of the CQI channel may be updated whenever the received SNR of the CQI channel is available. Outer loop 412 is the next fastest loop, and the target SNR may be updated whenever a codeword is received on the CQI channel. Third loop 414 is the slowest loop, and the erasure threshold may be updated whenever a known codeword is received on the CQI channel. The update rates for the three loops may be selected to achieve the desired performance for the CQI channel.

Figure 5:
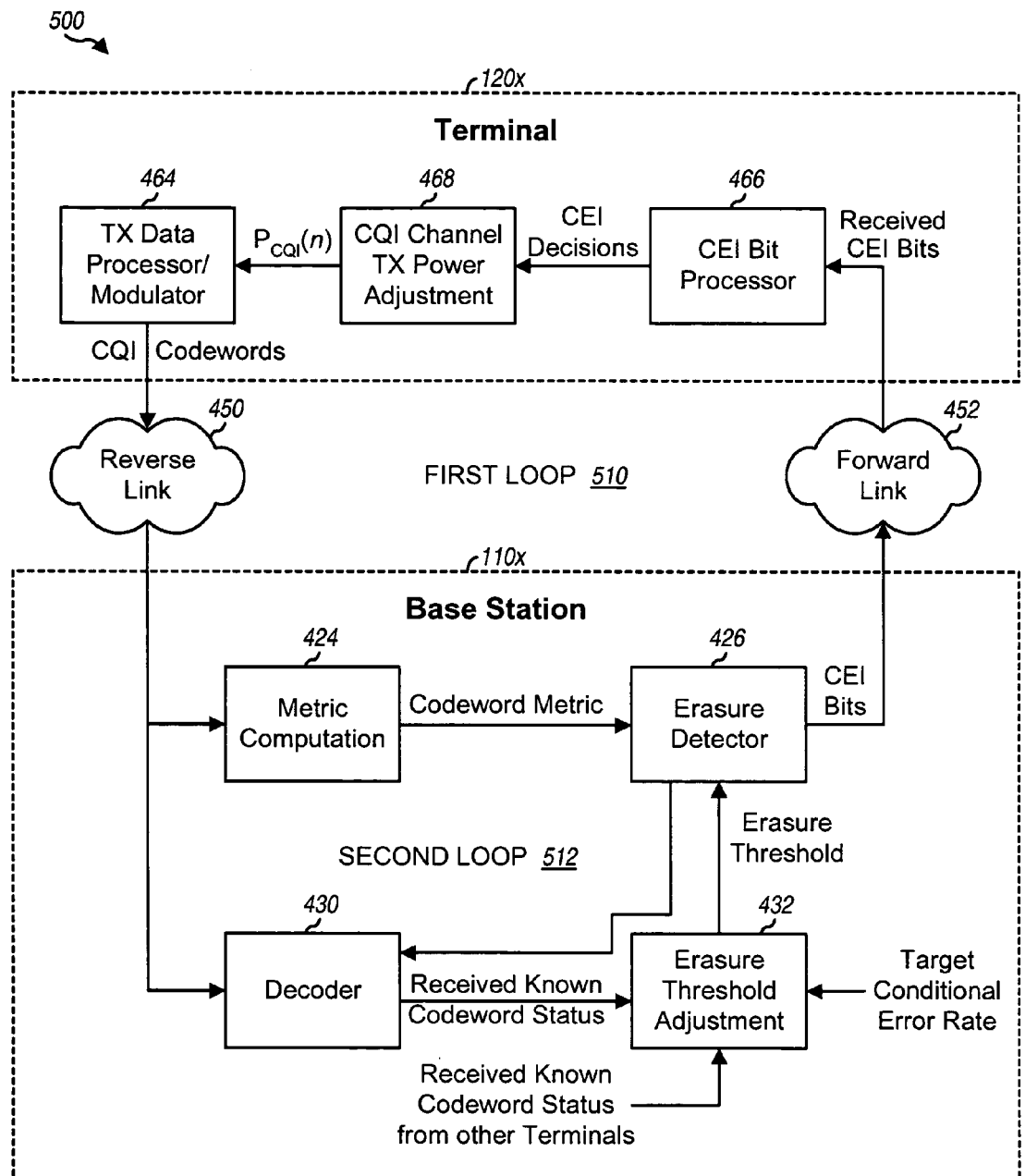
FIG. 5 shows a power control mechanism for an erasure-based PC scheme.

FIG. 5 shows an embodiment of a power control mechanism 500 that implements the erasure-based PC scheme for the CQI channel. Power control mechanism 500 includes a first loop 510 and a second loop 512.

First loop 510 adjusts the transmit power of the CQI channel to achieve the target erasure rate for the CQI channel. For first loop 510, metric computation unit 424 computes the metric M(n) for each codeword received on the CQI channel. Erasure detector 426 performs erasure detection for each received codeword based on the metric M(n) and the erasure threshold and generates a CEI bit based on the result of the erasure detection. The CEI bit indicates whether the received codeword is erased or non-erased. Base station 110x transmits the CEI bits on the forward link to terminal 120x.

At terminal 120x, a CEI bit processor 466 receives the CEI bits sent by base station 110x and makes a decision of erased or non-erased for each received CEI bit. A unit 468 may adjust the transmit power of the CQI channel based on the CEI decisions from processor 466, as follows:

$$P_{CQI}(n+1) = \qquad \text{Eq (8)}$$
$$\begin{cases} P_{CQI}(n) + \Delta P_{CQI,up} & \text{for an erased decision,} \\ P_{CQI}(n) - \Delta P_{CQI,dn} & \text{for a non-erased decision,} \end{cases}$$

where $\Delta P_{CQI,up}$ is an up step size for an erased decision, and $\Delta P_{CQI,dn}$ is a down step size for a non-erased decision.

The up and down step sizes may be set based on the target erasure rate, as follows:

$$\Delta P_{CQI,up} = \Delta P_{CQI,dn} \cdot \left( \frac{1 - Pr_{erasure}}{Pr_{erasure}} \right). \qquad \text{Eq (9)}$$

Base station 110x may broadcast the up and/or down step size to the terminals within its coverage area. In a given deployment, the target erasure rate may change very slowly. Thus, the overhead of broadcasting the up and/or down step size may be a small percentage of the total overhead.

Second loop 512 adjusts the erasure threshold based on received known codewords such that the target conditional error rate is achieved for the CQI channel. Second loop 512 operates as described above for third loop 414 in FIG. 4.

First loop 510 and second loop 512 may operate at different rates. First loop 510 may be updated whenever a codeword is received on the CQI channel. Second loop 512 may be updated whenever a known codeword is received on the CQI channel.

In the embodiments shown in FIGS. 4 and 5, the performance of the CQI channel is quantified by a target erasure rate and a target conditional error rate. Performance may also be quantified by other measures. The power control mechanisms may be modified accordingly based on the measures used to quantify performance.

2. Power Control for ACK Channel

In an embodiment, the ACK channel is transmitted at a fixed power offset relative to the transmit power of the CQI channel. The fixed power offset may be selected to provide good performance for all terminals in a sector and for various operating scenarios (e.g., vehicular, pedestrian, and so on).

In another embodiment, the ACK channel for each terminal is transmitted at an adjustable power offset relative to the transmit power of the CQI channel for that terminal. The power offset may be adjusted in various manners, e.g., with a closed loop. The power offset may be increased by an up step size if there is an ACK error and may be decreased by a down step size if there is no ACK error.

For the H-ARQ transmission scheme shown in FIG. 3, a base station transmits another data block for a current packet upon receiving an NAK (or no ACK) and transmits a new packet upon receiving an ACK. If a terminal transmits an ACK but the base station detects the ACK in error, then the base station would transmit another data block for the current packet. The terminal may thus be able to deduce that an ACK error has occurred if the terminal transmits an ACK but receives another data block for the current packet. Hence, a separate feedback channel is not needed on the forward link to convey ACK errors since these errors may be implicitly deduced by the terminal.

Figure 6:
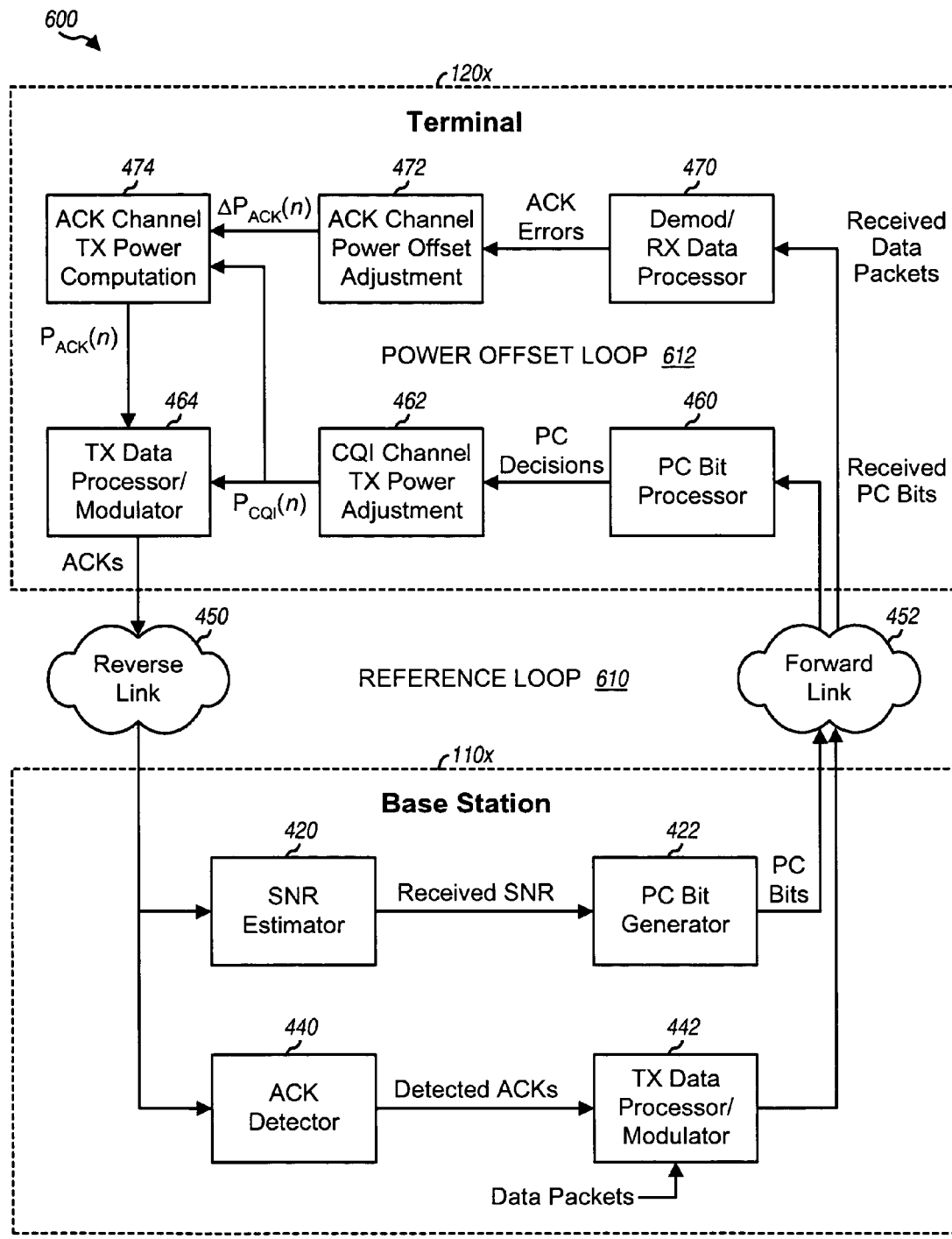
FIG. 6 shows a power control mechanism for an ACK channel.

FIG. 6 shows an embodiment of a power control mechanism 600 that may be used for the ACK channel. Power control mechanism 600 includes a reference loop 610 and a power offset loop 612. Reference loop 610 provides a reference transmit power level. Reference loop 610 may be inner loop 410 in FIG. 4, first loop 510 in FIG. 5, or some other loop that operates based on a designated channel. In the embodiment shown in FIG. 6, reference loop 610 is implemented with inner loop 410, and the transmit power of the CQI channel is used as the reference transmit power level. Reference loop 610 includes units 420, 422, 460, 462 and 464 that operate as described above for FIG. 4.

Power offset loop 612 adjusts the power offset for the ACK channel. For power offset loop 612, an ACK detector 440 at base station 110x detects for ACKs sent by terminal 120x and provides the detected ACKs. For each potential ACK transmission, ACK detector 440 may determine the energy of the ACK channel, compare the energy against a threshold, and declare a detected ACK if the energy is above the threshold. A TX data processor/modulator 442 receives data packets for terminal 120x and processes each data packet to generate data blocks. Unit 442 also receives the detected ACKs from detector 440, transmits a data block for a new packet if an ACK is detected, and transmits another data block for a current packet if an ACK is not detected.

At terminal 120x, a demodulator/receive (Demod/RX) data processor 470 receives the block transmissions from base station 110x and attempts to demodulate and decode each received data block. Processor 470 may first perform decoding for a hypothesis that the ACK (if any) sent by terminal 120x was correctly detected. If there is decoding error, then processor 470 may next perform decoding for a hypothesis that the ACK (if any) sent by terminal 120x was not detected. Processor 470 determines whether an ACK error has occurred based on its knowledge of the transmitted ACK (if any) and the decoding results for the received data block.

A unit 472 may adjust the power offset for the ACK channel based on the detected ACK errors from processor 470, as follows:

$$\Delta P_{ACK}(n+1) = \begin{cases} \Delta P_{ACK}(n) + \Delta P_{ACK,up} & \text{for an } ACK \text{ error,} \\ P_{CQI}(n) - \Delta P_{ACK,dn} & \text{for no } ACK \text{ error,} \end{cases} \quad \text{Eq (10)}$$

where $\Delta P_{ACK}(n)$ is a power offset for the ACK channel in update interval n,
$\Delta P_{ACK,up}$ is an up step size for the power offset, and
$\Delta PACK,dn$ is a down step size for the power offset.

The power offset $\Delta P_{ACK}$ (n) and the up and down step sizes $\Delta P_{ACK, up}$ and $\Delta P_{ACK, dn}$ are given in units of dB. The up and down step sizes may be set to achieve the desired ACK error rate, e.g., as shown in equation (9). In an embodiment, the up and down step sizes are fixed for all data blocks of a given packet. In another embodiment, the up and/or down step size may be dependent on the number of data blocks sent for a given packet and/or other factors.

A computation unit 474 computes the transmit power of the ACK channel based on the transmit power of the CQI channel and the power offset, as follows:

$$P_{ACK}(n) = P_{CQI}(n) + \Delta P_{ACK}(n), \quad \text{Eq (11)}$$

where $P_{ACK}(n)$ is the transmit power of the ACK channel in update interval n.

For each received data block, TX data processor/modulator 464 generates an ACK if the packet is decoded correctly by processor 470 and transmits the ACK at transmit power of $P_{ACK}(n)$ on the ACK channel.

3. Power Control for OFDMA Data Channels

The data channels may be sent using OFDMA and may be orthogonal to one another in time and frequency. Hence, in theory, multiple terminals may simultaneously transmit on the data channels to a base station without interfering one another. However, complete orthogonality among the data transmissions from different terminals is often not realized due to channel conditions, receiver imperfections, and so on. The loss in orthogonality results in each terminal causing some amounts of interference to other terminals communicating with the same base station. The intra-sector interference is typically not substantial with OFDMA.

The data transmissions from terminals communicating with different base stations are typically not orthogonal to one another. Thus, each terminal may cause interference to other terminals communicating with nearby base stations. The performance of each terminal is degraded by the interference from all other terminals in the system. The amount of inter-sector interference caused by a given terminal is determined by the amount of transmit power used by that terminal and the location of the terminal relative to the neighbor base stations. The inter-sector interference may be small if the terminal is located near its serving base station and may be large if the terminal is located at the edge of coverage.

For the data channels, power control may be performed such that each terminal is allowed to transmit at a power level that is as high as possible while keeping intra-sector and inter-sector interference to within acceptable levels. A terminal located closer to its serving base station may be allowed to transmit at a higher power level since this terminal will likely cause less interference to neighbor base stations. Conversely, a terminal located farther away from its serving base station and toward the coverage edge may be allowed to transmit at a lower power level since this terminal may cause more interference to neighbor base stations. Controlling transmit power in this manner may potentially reduce the total interference observed by each base station while allowing "qualified" terminals to achieve higher SNRs and thus higher data rates. Power control for the data channels may be performed in various manners to attain the goals noted above.

In an embodiment, the transmit power of a data channel for a terminal is set to achieve a particular transmit PSD, which may be expressed as:

$$PSD_{DCH}(n) = PSD_{REF}(n) + \Delta PSD(n), \quad \text{Eq (12)}$$

where $PSD_{DCH}$ (n) is the transmit PSD of the data channel in update interval n, PSD$_{REF}$(N) is a reference PSD level in update interval n, and ΔPSD(n) is a transmit PSD delta for the data channel in update interval n.

The PSD levels PSD$_{DCH}$(n) and PSD$_{REF}$(n) are given in units of decibels/Hertz (dB/Hz) and the transmit PSD delta ΔPSD (n) is given in units of dB.

The reference PSD level is a transmit PSD level that achieves a target SNR for a designated transmission. In an embodiment, the designated transmission is the CQI channel. If the reference PSD level can achieve the target SNR, then the received SNR of the data channel may be expressed as:

$$SNR_{DCH}(n) = SNR_{target} + \Delta PSD(n), \quad \text{Eq (13)}$$

where SNR$_{DCH}$(n) is the received SNR of the data channel in update interval n.

Equation (13) assumes that the data channel and the CQI channel have similar interference statistics. This is the case, e.g., if the CQI and data channels in different sectors may interfere with one another. Otherwise, an interference offset between the CQI channel and the data channel may be determined (e.g., by the base station and broadcast to the terminals) and may be taken into account in equation (12).

The transmit PSD of the data channel may be set based on various factors such as (1) the amount of inter-sector interference the terminal might cause to other terminals in neighbor sectors, (2) the amount of intra-sector interference the terminal might cause to other terminals in the same sector, (3) the maximum power level allowed for the terminal, and (4) possibly other factors.

The amount of inter-sector interference a terminal might cause may be determined in various manners. In an embodiment, the amount of inter-sector interference caused by the terminal may be estimated by each neighbor base station and sent to the terminal, which may then adjust its transmit power accordingly. This individualized interference reporting may require extensive overhead signaling. In another embodiment, the amount of inter-sector interference the terminal might cause may be roughly estimated based on (1) the total interference observed by each neighbor base station, (2) the channel gains for the serving and neighbor base stations, and (3) the transmit power level used by the terminal. This embodiment is described below.

Each base station may estimate the total or average amount of interference observed by that base station. The interference may be quantified by an interference-over-thermal (IOT) or some other quantity. IOT is a ratio of the total interference power observed by the base station to the thermal noise power. In an embodiment, the base station generates an other-sector interference (OSI) value or report as follows:

$$OSI_m(n) = \begin{cases} '2' & \text{if } IOT_{meas,m}(n) \geq IOT_{high}, \\ '1' & \text{if } IOT_{high} > IOT_{meas,m}(n) \geq IOT_{target}, \\ '0' & \text{if } IOT_{target} > IOT_{meas,m}(n), \end{cases} \quad \text{Eq (14)}$$

where IOT$_{mea,m}$(n) is a measured IOT for sector m in update interval n,

IOT$_{target}$ is a target operating point for the system,

IOT$_{high}$ is a high threshold for inter-sector interference, and

OSI$_m$(n) is the OSI value for sector m in update interval n.

In the embodiment shown in equation (14), the OSI value is set to '0' to indicate low inter-sector interference, '1' to indicate high inter-sector interference, and '2' to indicate excessive inter-sector interference. The OSI value may also be set in other manners. The base station may broadcast the OSI value to the terminals in other sectors.

A terminal may estimate the channel gain (or path loss) for each base station that may receive the reverse link transmission from the terminal. The channel gain for each base station may be estimated based on the pilot received from the base station. A channel gain ratio may be computed for each neighbor base station as follows:

$$r_m = \frac{g_s(n)}{g_m(n)}, \quad \text{Eq (15)}$$

where g$_s$(n) is the channel gain for the serving base station, g$_m$(n) is the channel gain for neighbor base station m, and r$_m$(n) is the channel gain ratio for neighbor base station m.

The channel gain ratio for each neighbor base station may be considered as a relative distance that indicates the distance to that neighbor base station relative to the distance to the serving base station. In general, the channel gain ratio for a neighbor base station increases as the terminal moves closer to the serving base station and decreases as the terminal moves toward the coverage edge.

A terminal may monitor the OSI values broadcast by neighbor base stations. In an embodiment, the terminal considers only the OSI value of the strongest neighbor base station, which has the smallest channel gain ratio. The terminal may adjust its transmit PSD delta as follows:

$$\Delta PSD(n+1) = \begin{cases} \Delta PSD(n) - \delta_{dn} & \text{if } OSI \text{ value} = '1' \text{ or } '2', \\ \Delta PSD(n) + \delta_{up} & \text{if } OSI \text{ value} = '0', \end{cases} \quad \text{Eq (16)}$$

where $\delta_{up}$ is an up step size for the transmit PSD delta, and $\delta_{dn}$ is a down step size for the transmit PSD delta.

In equation (16), if the OSI value of the strongest neighbor base station is set to '1' or '2' due to that base station observing higher than nominal inter-sector interference, then the transmit PSD delta may be adjusted downward. Conversely, if the OSI value is set to '0', then the transmit PSD delta may be adjusted upward. $\delta_{up}$ and $\delta_{dn}$ determine the amount of adjustment for the transmit PSD delta. In one embodiment, $\delta_{up}$ and $\delta_{dn}$ are fixed values. In another embodiment, $\delta_{up}$ and $\delta_{dn}$ are variable values that may be dependent on the current transmit power level or the current transmit PSD delta for the terminal, the channel gain ratio for the strongest neighbor base station, and/or other factors.

In other embodiments, the terminal may consider the OSI values of multiple neighbor base stations. In any case, the OSI values from the neighbor base stations determine the direction in which to adjust the transmit PSD delta.

A specific embodiment for maintaining inter-sector interference within acceptable levels has been described above. Inter-sector interference may also be maintained within acceptable levels based on other parameters and/or in other manners.

Although the data channels for each sector are designed to be orthogonal to one another, some loss in orthogonality may result from inter-carrier interference (ICI), inter-symbol interference (ISI), and so on. This loss of orthogonality causes intra-sector interference. To mitigate intra-sector interference, the transmit PSD of each terminal may be controlled such that the amount of intra-sector interference that the terminal might cause to other terminals in the same sector is maintained within acceptable levels. In an embodiment, acceptable intra-sector interference is achieved by constraining the transmit PSD delta to be within a predetermined range, as follows:

$$\Delta PSD(n) \in [\Delta PSD_{max}, \Delta PSD_{min}], \quad \text{Eq (17)}$$

where $\Delta PSD_{max}$ is the maximum transmit PSD delta and $\Delta PSD_{min}$ is the minimum transmit PSD delta allowable for the data channel.

Figure 7:
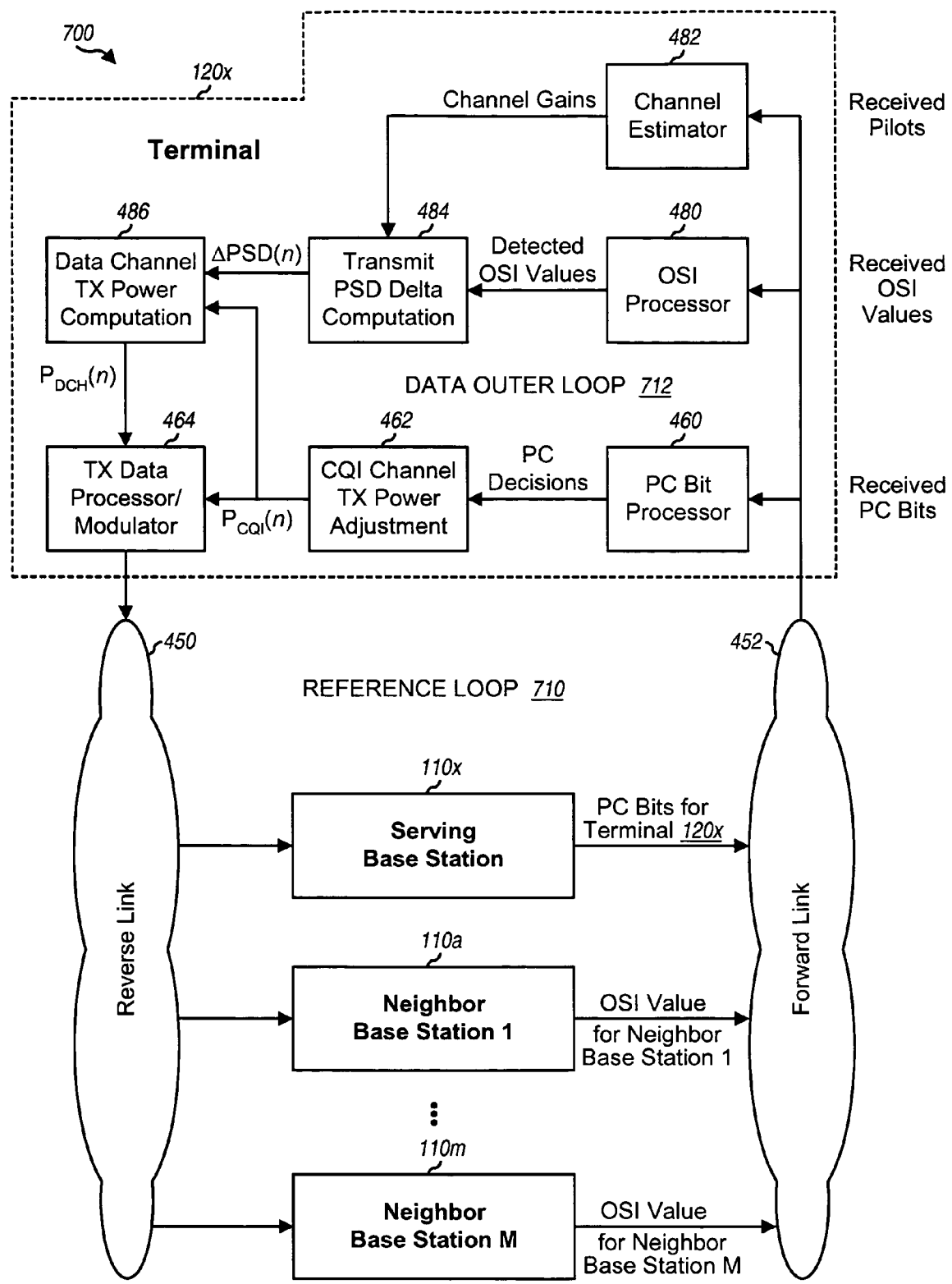
FIG. 7 shows a power control mechanism for a data channel.

FIG. 7 shows an embodiment of a power control mechanism 700 that may be used for the data channel. Terminal 120x communicates with serving base station 110x and may cause interference to neighbor base stations 110a through 110m. Power control mechanism 700 includes (1) a reference loop 710 that operates between terminal 120x and serving base station 110x and (2) a data outer loop 712 that operates between terminal 120x and neighbor base stations 110a through 110m. Reference loop 710 and data outer loop 712 may operate concurrently but may be updated at different rates, e.g., reference loop 710 may be updated more frequently than data outer loop 712. For simplicity, FIG. 7 shows only the portion of loops 710 and 712 residing at terminal 120x.

Reference loop 710 provides the reference PSD level in equation (12). Reference loop 710 may be inner loop 410 in FIG. 4, first loop 510 in FIG. 5, or some other loop that operates based on a designated channel. In the embodiment shown in FIG. 7, reference loop 710 is implemented with inner loop 410, and the transmit PSD of the CQI channel is used as the reference PSD level.

Data outer loop 712 adjusts the transmit PSD of the data channel to be as high as possible while keeping intra-sector and inter-sector interference to within acceptable levels. For data outer loop 712, each neighbor base station 110 receives transmissions on the reverse link, estimates the inter-sector interference observed by that base station from the terminals in other sectors, generates an OSI value based on the interference estimate, e.g., as shown in equation (14), and broadcasts the OSI value to the terminals in the other sectors.

At terminal 120x, an OSI processor 480 receives the OSI values broadcast by the neighbor base stations and provides detected OSI values to a transmit PSD delta computation unit 484. A channel estimator 482 receives pilots from the serving and neighbor base stations, estimates the channel gain for each base station, and provides the estimated channel gains for all base stations to unit 484. Unit 484 determines the channel gain ratios for the neighbor base stations and further adjusts the transmit PSD delta based on the detected OSI values, the channel gain ratios, and the maximum and minimum transmit PSD deltas, as described above.

A computation unit 486 may determine the reference PSD level based on the transmit power of the CQI channel, as follows:

$$PSD_{REF}(n) = \frac{P_{CQI}(n)}{N_{CQI}}, \quad \text{Eq (18)}$$

where $N_{CQI}$ is the number of subcarriers used for the CDMA control segment on which the CQI channel is sent. Unit 486 then computes the transmit PSD of the data channel based on the reference PSD level and the transmit PSD delta, e.g., as shown in equation (12). Unit 486 may then compute the transmit power of the data channel based on the transmit PSD, as follows:

$$P_{DCH}(n) = PSD_{DCH}(n) \cdot N_{DCH}, \quad \text{Eq (19)}$$

where $N_{DCH}$ is the number of subcarriers used for the data channel, and $P_{DCH}(n)$ is the transmit power of the data channel in update interval n.

TX data processor/modulator 464 uses the transmit power $P_{DCH}(n)$ for data transmission to serving base station 110x.

Terminal 120x may send various types of feedback information to serving base station 110x. For example, terminal 120x may send the transmit PSD delta, the maximum number of subcarriers that the terminal can support at the current transmit PSD delta, the desired quality of service (QoS), the buffer size, and so on. Terminal 120x may send the feedback information (e.g., the transmit PSD delta and/or the maximum number of supported subcarriers) every few update intervals to reduce the amount of signaling and may also send the information via in-band signaling on the data channel. If terminal 120x has a low transmit PSD delta, then the terminal may be assigned more subcarriers in order to utilize more or all of the available transmit power.

4. System Stability

For the CDMA control channels on the reverse link, the CDMA transmission from each terminal acts as interference to the CDMA transmissions from other terminals at a base station. The power control techniques described herein adjust the transmit power of each terminal to achieve the desired level of performance while minimizing interference to other terminals. The capacity and stability of the CDMA control channels may be quantified by a rise-over-thermal ratio (RoT), which is the ratio of the total power received at the base station over thermal noise power. In general, capacity increases for higher RoT. However, capacity gains are minimal above a particular value of RoT.

A terminal typically has a given maximum transmit power $P_{max}$, which may be specified by regulatory requirements. The terminal typically transmits at higher power level for larger path loss as well as higher RoT in order to achieve the target SNR. If the path loss is too great and/or the RoT is too high, then the terminal may not be able to achieve the target SNR with the maximum transmit power.

A base station may limit the RoT to ensure that terminals with high path loss are not in outage and to ensure system stability. The base station may estimate its RoT and compare the estimated RoT against a threshold. If the estimated RoT exceeds the threshold, then the base station may take corrective actions to decrease the RoT. The corrective actions may include the following:

Deny new users from accessing the system,
De-assign some users that have already been granted access to the system,
Increase the target erasure/error rate, and
Allocate additional resources for the control channels.

The base station may also take other corrective actions besides those listed above.

For the OFDMA data channels on the reverse link, intra-sector interference is minimal, and the capacity and stability of a base station are determined by IOT. Thus, for the OFDMA data channels, IOT rather than RoT may be controlled.

IOT may be reduced if it becomes excessive in order to avoid outage for disadvantaged users. A base station experiencing excessive IOT may broadcast an OSI value of '2' over the air. Users that can receive this OSI value may reduce their transmit PSD deltas faster and/or by larger steps. For network-based interference control, a base station experiencing excessive IOT may report its IOT to neighbor base stations. The inter-sector OSI report may be the same as the over-the-air OSI report or may be more comprehensive. A base station may also report its RoT and/or other information to neighbor base stations. The neighbor base stations may regulate data transmissions by controlling admission of new users to their sectors, de-assigning users that have already been admitted, scheduling the users in their sectors in a manner to reduce interference to the neighbor base stations, assigning the users in their sectors with data channels that cause less interference to the neighbor base stations, adjusting transmit power of the users, and/or perform other actions in order to mitigate degradation to the base station experiencing excessive IOT or RoT. For example, the other base stations may reduce the transmit power of the users in their sectors whenever excessive IOT or RoT is reported by another base station.

A power control scheme may also control all terminals to a given RpoT target. However, this power control scheme would ignore the fact that terminals at different locations cause different amounts of inter-sector interference, and ignoring this fact may reduce system capacity. Also, equal grade of service throughput may be achieved in the system by the equal RpoT power control scheme whereas proportionally fair throughput may also be achieved by the delta-based power control scheme shown in FIG. 7.

The base stations may be synchronized and may transmit their CDMA control segments in the same time-frequency region. In this case, the CDMA control channels for each sector may be orthogonal to the OFDMA data channels in neighbor sectors. Hence, RoT-based control of the CDMA control channels may not affect IOT-based control of the OFDMA data channels, and vice versa.

The base stations may be unsynchronized and may transmit their CDMA control segments in different time-frequency regions. In this case, the CDMA control channels for each sector may experience higher interference from the OFDMA data channels in neighbor sectors, and the performance of the control channels may be degraded. This degradation may be mitigated if the target interference level on the data channels is set close to the target interference level on the control channels. However, this constraint may reduce the capacity of the data channels. Data capacity may be improved if the degradation on the control channels due to inter-sector interference from the data channels can be tolerated or mitigated, e.g., by increasing the dimension of the CDMA control segment.

5. System

FIG. 8 shows an embodiment of a process 800 for performing power control in a system utilizing multiple radio technologies. Process 800 may be performed by a terminal. A reference channel is sent using a first radio technology, e.g., CDMA (block 812). A second channel is sent using a second radio technology, e.g., OFDMA (block 814). The reference channel may be a control channel carry signaling, e.g., CQI information. The second channel may be a data channel carrying traffic data. The transmit power of the reference channel is adjusted to achieve a target level of performance for the reference channel (block 816). The transmit power of the second channel is adjusted based on the transmit power of the reference channel (block 818).

The transmit power of the reference channel may be adjusted based on PC commands, which may be generated to achieve a target received signal quality for the reference channel at a receiving base station. The transmit power of the reference channel may also be adjusted based on erasure indications for codewords sent on the reference channel. The target level of performance for the reference channel may be quantified by a target erasure rate and/or some other measure. The target received signal quality may be adjusted to achieve the target erasure rate. The up and down step sizes for the transmit power of the reference channel may also be set to achieve the target erasure rate.

A transmit power delta or a transmit PSD delta for the second channel may be adjusted, e.g., based on interference estimates. The transmit power of the second channel may then be determined based on the transmit power of the reference channel and the transmit power delta or the transmit PSD delta.

FIG. 9 shows an embodiment of an apparatus 900 for performing power control in a system utilizing multiple radio technologies. Apparatus 900 includes one or mpre processors for sending a reference channel using a first radio technology, e.g., CDMA (block 912), one or mpre processors for sending a second channel using a second radio technology, e.g., OFDMA (block 914), one or more processors for adjusting the transmit power of the reference channel to achieve a target level of performance for the reference channel (block 916), and one or more processors for adjusting the transmit power of the second channel based on the transmit power of the reference channel (block 918).

Figure 10:
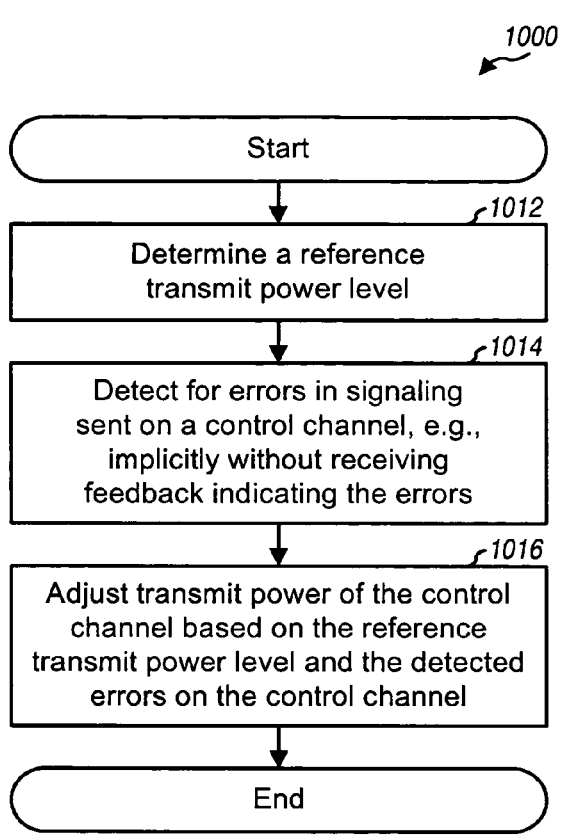
FIGS. 10 and 11 show a process and an apparatus, respectively, for performing power control for a control channel, e.g., an ACK channel.

FIG. 10 shows an embodiment of a process 1000 for performing power control for a control channel, e.g., an ACK channel. A reference transmit power level is determined (block 1012). The reference transmit power level may be the transmit power of a reference channel that may be power controlled to achieve a desired level of performance for the reference channel. Errors in signaling sent on a control channel are detected, e.g., implicitly without receiving feedback indicating the errors (block 1014). The signaling may be ACKs, and the errors in the ACKs sent on the control channel may be detected based on data packets received on a data channel. The transmit power of the control channel is adjusted based on the reference transmit power level and the detected errors on the control channel (block 1016).

Figure 11:
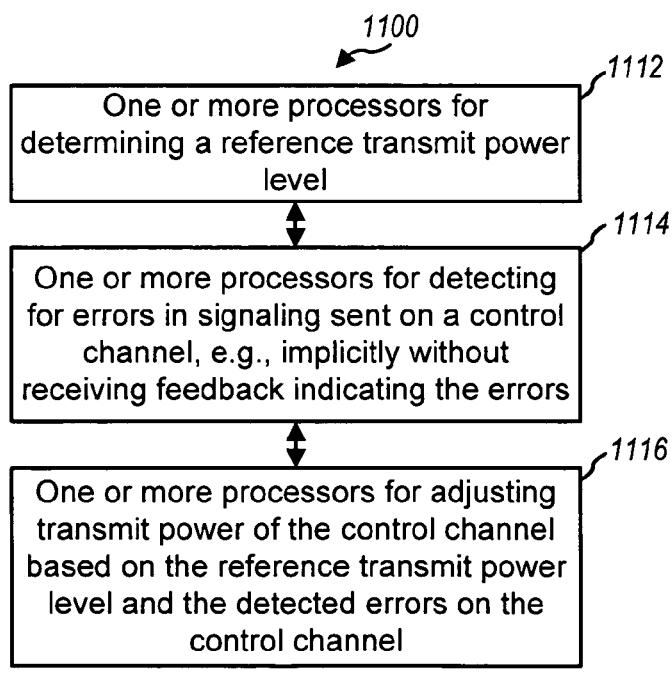

FIG. 11 shows an embodiment of an apparatus 1100 for performing power control for a control channel, e.g., an ACK channel. Apparatus 1100 includes one or more processors for determining a reference transmit power level (block 1112), one or more processors for detecting for errors in signaling sent on a control channel, e.g., implicitly without receiving feedback indicating the errors (block 1114), and one or more processors for adjusting the transmit power of the control channel based on the reference transmit power level and the detected errors on the control channel (block 1116).

Figure 12:
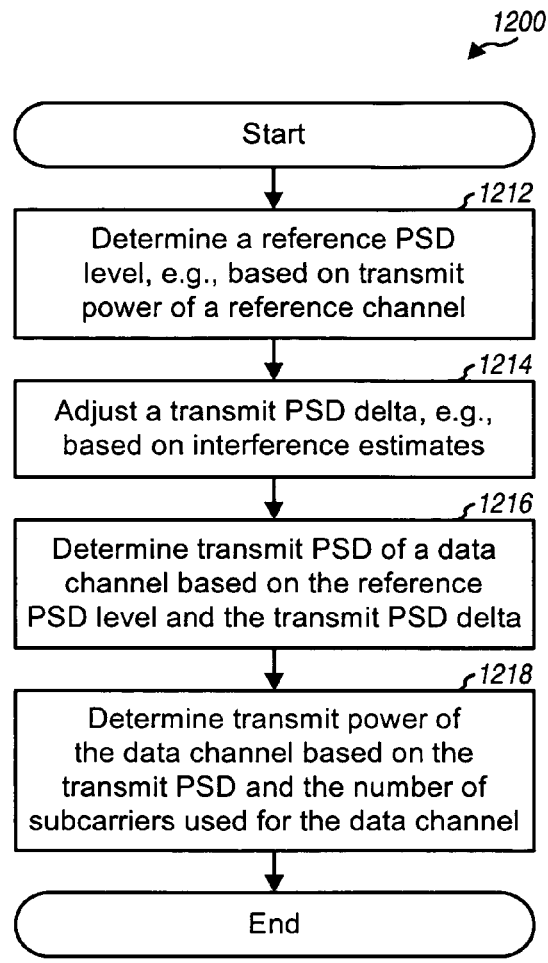
FIGS. 12 and 13 show a process and an apparatus, respectively, for performing power control for a data channel.

FIG. 12 shows an embodiment of a process 1200 for performing power control for a data channel. A reference PSD level is determined, e.g., based on the transmit power of a reference channel that may be power controlled to achieve a desired level of performance for the reference channel (block 1212). A transmit PSD delta is adjusted, e.g., based on interference estimates (block 1214). A transmit PSD of the data channel is determined based on the reference PSD level and the transmit PSD delta (block 1216). The transmit power of the data channel may then be determined based on the transmit PSD and the number of subcarriers used for the data channel (block 1218). The reference channel may be sent using CDMA, and the data channel may be sent using OFDMA. The reference and data channels may also be sent using other radio technologies.

For block 1214, interference reports may be received from base stations. Channel gains for the base stations may be estimated, e.g., based on pilots received from the base stations. The transmit PSD delta may then be adjusted based on the channel gains estimated for the base stations and the interference reports received from the base station. For example, the transmit PSD delta may be decreased if at least one (e.g., the strongest) neighbor base station indicates high interference and may be increased if the at least one neighbor base station does not indicate high interference. The transmit PSD delta may be limited to be within a range of values determined by the maximum and minimum PSD deltas allowed for the data channel.

Figure 13:
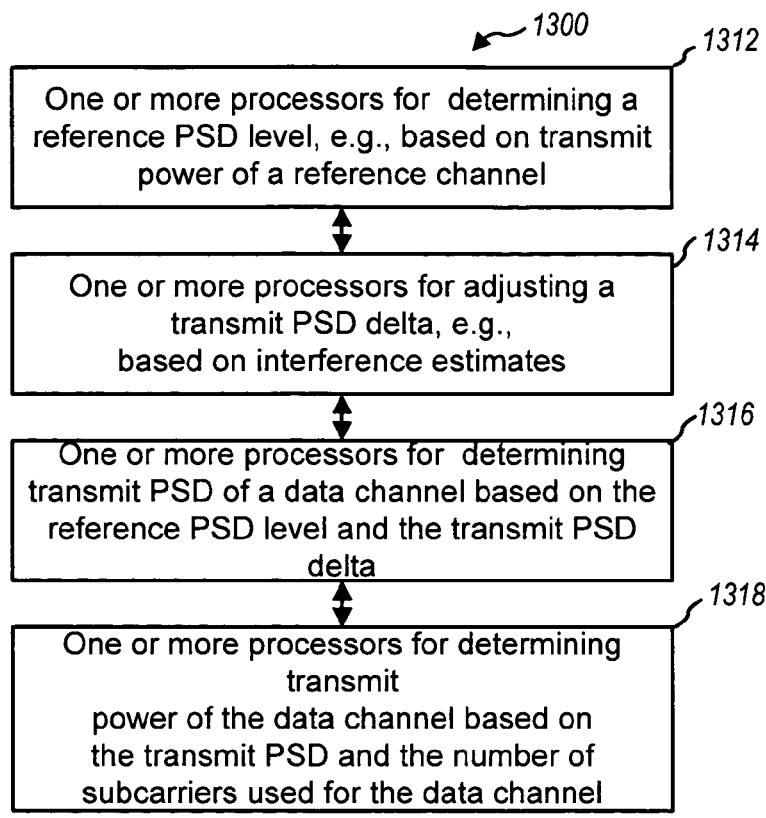

FIG. 13 shows an embodiment of an apparatus 1300 for performing power control for a data channel. Apparatus 1300 includes one or more processors for determining a reference PSD level, e.g., based on the transmit power of a reference channel (block 1312), one or more processors for adjusting a transmit PSD delta, e.g., based on interference estimates (block 1314), one or more processors for determining a transmit PSD of the data channel based on the reference PSD level and the transmit PSD delta (block 1316), and one or more processors for determining the transmit power of the data channel based on the transmit PSD and the number of subcarriers used for the data channel (block 1318).

Figure 14:
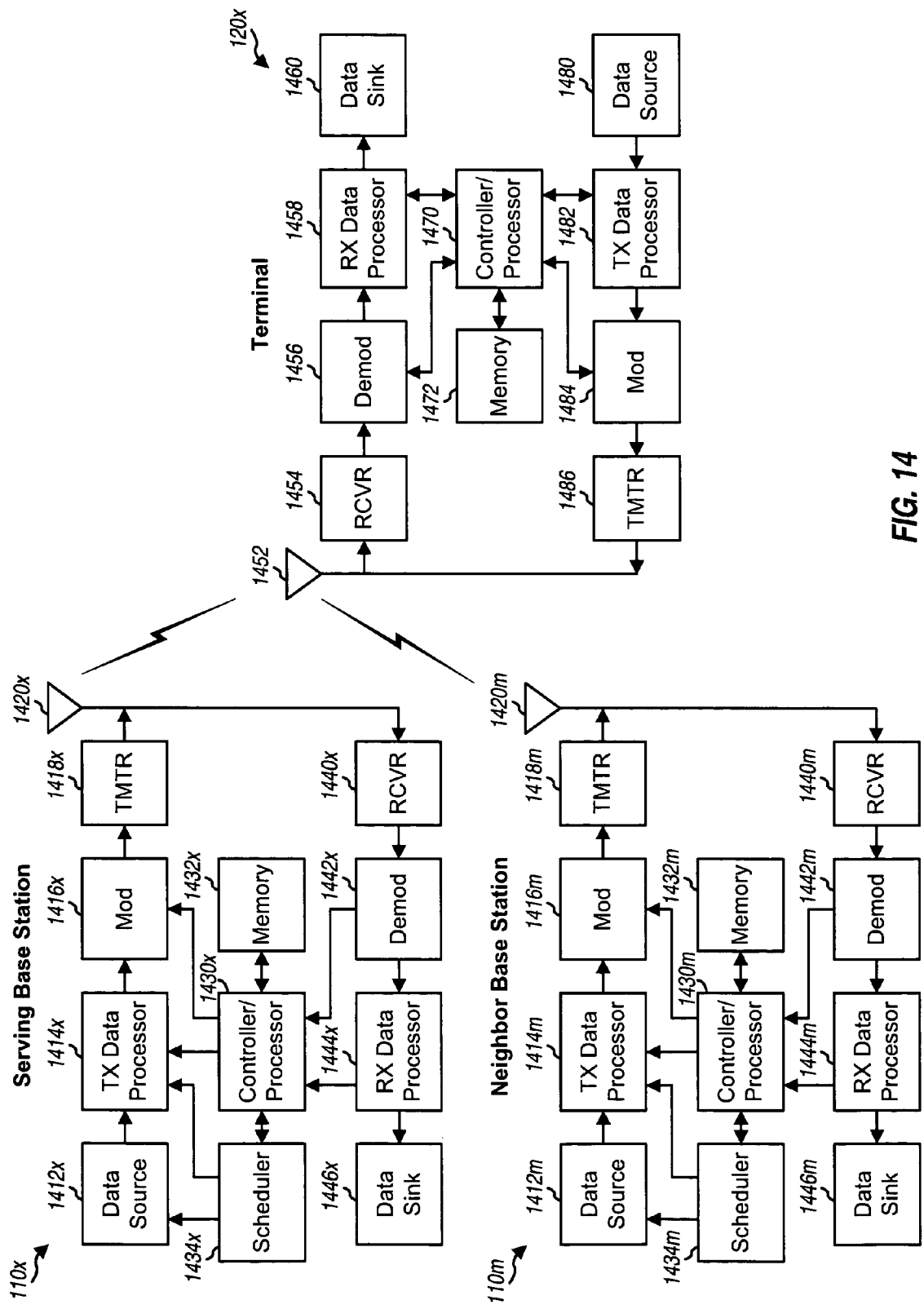
FIG. 14 shows a block diagram of a terminal and two base stations.

FIG. 14 shows a block diagram of an embodiment of terminal 120x, serving base station 110x, and neighbor base station 110m in system 100. For clarity, the following description assumes the use of power control mechanisms 400, 600 and 700 in FIGS. 4, 6 and 7, respectively.

At serving base station 10x, a TX data processor 1414 receives traffic data from a data source 1412x and signaling from a controller/processor 1430x and a scheduler 1434x. For example, controller/processor 1430x may provide PC commands to adjust the transmit power of terminals communicating with base station 120x, and scheduler 1434x may provide assignments of data channels and/or subcarriers for the terminals. TX data processor 1414x processes (e.g., encodes, interleaves, and symbol maps) the traffic data and signaling and provides symbols. A modulator (Mod) 1416x performs OFDM modulation for data channels sent using OFDMA, performs CDMA modulation for control channels sent using CDMA, and provides a sequence of complex-valued chips. A transmitter (TMTR) 1418x conditions (e.g., converts to analog, amplifies, filters, and frequency upconverts) the chip sequence and generates a forward link signal, which is transmitted via an antenna 1420x.

Neighbor base station 110m similarly processes traffic data and signaling for the terminals served by that base station. Base station 110m also sends OSI reports that indicate the amount of interference observed by the base station. The traffic data and signaling are processed by a TX data processor 1414m, modulated by a modulator 1416m, conditioned by a transmitter 1418m, and transmitted via an antenna 1420m.

At terminal 120x, an antenna 1452 receives the forward link signals from base stations 110x and 110m and possibly other base stations. A receiver (RCVR) 1454 conditions (e.g., filters, amplifies, frequency downconverts, and digitizes) a received signal from antenna 1452 and provides samples. A demodulator (Demod) 1456 performs OFDM demodulation for the data channel, performs CDMA demodulation for the control channels, and provides symbol estimates. An RX data processor 1458 processes (e.g., symbol demaps, deinterleaves, and decodes) the symbol estimates, provides decoded data to a data sink 1460, and provides detected signaling (e.g., PC commands, OSI reports, and so on) to a controller/processor 1470.

On the reverse link, a TX data processor 1482 receives and processes traffic data from a data source 1480 and signaling (e.g., ACKs, CQI codewords) from controller/processor 1470. A modulator 1484 performs OFDM modulation for a data channel sent using OFDMA, performs CDMA modulation for control channels sent using CDMA, and provides a sequence of chips. A transmitter 1486 conditions the chip sequence and generates a reverse link signal, which is transmitted from antenna 1452. At serving base station 110x, the reverse link signals from terminal 120x and other terminals are received by antenna 1420x, conditioned by a receiver 1440x, demodulated by a demodulator 1442x, and processed by an RX data processor 1444x. Processor 1444x provides decoded data to a data sink 1446x and detected signaling to controller/processor 1430x. Receiver 1440x may estimate the received signal quality of a reference channel (e.g., the CQI channel) for each terminal and may provide this information to controller/processor 1430x. Controller/processor 1430x may derive PC commands and/or erasure indications for each terminal as described above.

Controllers/processors 1430x, 1430m and 1470 direct the operations of various processing units at base stations 110x and 110m and terminal 120x, respectively. These controllers/processors may also perform various functions for power control. For example, controller/processor 1430x may implement some or all of units 420 through 442 shown in FIGS. 4 through 7 for base station 110x. Controller 1470 may implement some or all of units 460 through 486 shown in FIGS. 4 through 7 for terminal 120x. Controller 1470 may also implement processes 800, 1000 and/or 1200 shown in FIGS. 8, 10 and 12, respectively. Memories 1432x, 1432m and 1472 store data and program codes for base stations 110x and 110m and terminal 120x, respectively. Scheduler 1434x schedules terminals communicating with base station 110x and assigns data channels and/or subcarriers to the scheduled terminals.

The power control techniques described herein may be implemented by various means. For example, these techniques may be implemented in hardware, firmware, software, or a combination thereof. For a hardware implementation, the processing units used to perform power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the power control techniques may be implemented with instructions (e.g., procedures, functions, and so on) that may be utilized by one or more processors to perform the functions described herein. The firmware and/or software codes may be stored in a memory (e.g., memory 1432x or 1472 in FIG. 14) and executed by a processor (e.g., processor 1430x or 1470). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   at least one processor to transmit a first signal via a reference channel using a first radio technology, to transmit a second signal via a second channel using a second radio technology, to adjust a transmit power of the reference channel, at least in part, to achieve a target level of performance for the reference channel, and to adjust a transmit power of the second channel based, at least in part, on a transmit power spectral density (PSD) of the reference channel; and a memory coupled to the at least one processor.

2. The apparatus of claim 1, wherein the first radio technology comprises Code Division Multiple Access (CDMA) and the second radio technology comprises Orthogonal Frequency Division Multiple Access (OFDMA).

3. The apparatus of claim 1, wherein the reference channel carries signaling and the second channel carries traffic data.

4. The apparatus of claim 1, the at least one processor to receive power control (PC) commands for the reference channel and to adjust the transmit power of the reference channel based, at least in part, on the received PC commands.

5. The apparatus of claim 4, wherein the PC commands are generated, at least in part, to achieve a target received signal quality for the reference channel.

6. The apparatus of claim 1, wherein the target level of performance for the reference channel is based, at least in part, on a target erasure rate for one or more codewords sent on the reference channel.

7. The apparatus of claim 1, the at least one processor to receive erasure indications for one or more codewords sent on the reference channel and to adjust the transmit power of the reference channel based, at least in part, on the one or more erasure indications.

8. The apparatus of claim 1, the at least one processor to increase the transmit power of the reference channel by an up step in response to a codeword sent on the reference channel being detected as an erasure, and to decrease the transmit power of the reference channel by a down step in response to the codeword sent being detected as non-erased.

9. The apparatus of claim 8, wherein the up and down steps are selected based, at least in part, on a target erasure rate for the reference channel.

10. The apparatus of claim 1, the at least one processor to adjust a power spectral density (PSD) delta based, at least in part, on one or more interference estimates and to set the transmit power of the second channel based, at least in part, on the PSD delta.

11. The apparatus of claim 1, the at least one processor to adjust a transmit power spectral density (PSD) delta based, at least in part, on one or more interference estimates, to determine a transmit PSD of the second channel based, at least in part, on the transmit PSD delta and the transmit PSD of the reference channel, and to set the transmit power of the second channel, at least in part, to achieve the transmit PSD of the second channel.

12. The apparatus of claim 1, wherein the reference channel carries channel quality indication (CQI) information.

13. A method comprising:
sending a first signal via a reference channel using a first radio technology;
sending a second signal via a second channel using a second radio technology;
adjusting a transmit power of the reference channel, at least in part, to achieve a target level of performance for the reference channel; and
adjusting a transmit power of the second channel based, at least in part, on a transmit power spectral density (PSD) of the reference channel.

14. The method of claim 13, wherein the adjusting the transmit power of the reference channel comprises receiving one or more power control (PC) commands for the reference channel, and adjusting the transmit power of the reference channel based, at least in part, on the one or more PC commands.

15. The method of claim 13, wherein the adjusting the transmit power of the reference channel comprises receiving one or more erasure indications for one or more codewords sent on the reference channel, and adjusting the transmit power of the reference channel based, at least in part, on the one or more erasure indications.

16. The method of claim 13, wherein the adjusting the transmit power of the second channel comprises adjusting a power spectral density (PSD) delta based on one or more interference estimates, and setting the transmit power of the second channel based, at least in part, on the PSD delta.

17. An apparatus comprising:
means for sending a first signal via a reference channel using a first radio technology;
means for sending a second signal via a second channel using a second radio technology;
means for adjusting a transmit power of the reference channel, at least in part, to achieve a target level of performance for the reference channel; and
means for adjusting a transmit power of the second channel based, at least in part, on a transmit power spectral density (PSD) of the reference channel.

18. The apparatus of claim 17, further comprising:
means for receiving one or more power control (PC) commands for the reference channel, and means for adjusting the transmit power of the reference channel based, at least in part, on the one or more PC commands.

19. The apparatus of claim 17, further comprising:
means for receiving one or more erasure indications for one or more codewords sent on the reference channel, and means for adjusting the transmit power of the reference channel based, at least in part, on the one or more erasure indications.

20. The apparatus of claim 17, further comprising:
means for adjusting a power spectral density (PSD) delta based, at least in part, on one or more interference estimates, and means for setting the transmit power of the second channel based, at least in part, on the PSD delta.

21. An article comprising:
a processor readable media having instructions stored thereon that are executable by one or more processors to initiate:
adjustment of a transmit power of a reference channel, the reference channel comprising a first signal being sent using a first radio, at least in part, to achieve a target level of performance for the reference channel; and
adjustment of a transmit power of a second channel, the second channel comprising a second signal being sent using a second radio technology, the transmit power of the second channel being adjusted based, at least in part, on a transmit power spectral density (PSD) of the reference channel.

22. An apparatus comprising: at least one processor to transmit a first signal via a reference channel using a first radio technology, to transmit a second signal via a second channel using a second radio technology, to adjust transmit power of the reference channel, at least in part, to achieve a target level of performance for the reference channel, and to adjust transmit power of the second channel based, at least in part, on the transmit power of the reference channel; and a memory coupled to the at least one processor, and the at least one processor further to adjust a transmit power spectral density (PSD) delta based, at least in part, on one or more interference estimates, to determine a transmit PSD of the second channel based, at least in part, on the transmit PSD delta and a transmit PSD of the reference channel, and to set the transmit power of the second channel, at least in part, to achieve the transmit PSD of the second channel.

23. The apparatus of claim 22, wherein the first radio technology comprises Code Division Multiple Access (CDMA) and the second radio technology comprises Orthogonal Frequency Division Multiple Access (OFDMA).

24. The apparatus of claim 22, wherein the reference channel carries signaling and the second channel carries traffic data.

25. The apparatus of claim 22, the at least one processor to receive power control (PC) commands for the reference channel and to adjust the transmit power of the reference channel based, at least in part, on the received PC commands.

26. The apparatus of claim 25, wherein the PC commands are generated, at least in part, to achieve a target received signal quality for the reference channel.

27. The apparatus of claim 22, wherein the target level of performance for the reference channel is based, at least in part, on a target erasure rate for one or more codewords sent on the reference channel.

28. The apparatus of claim 22, the at least one processor to receive erasure indications for one or more codewords sent on the reference channel and to adjust the transmit power of the reference channel based, at least in part, on the one or more erasure indications.

29. The apparatus of claim 22, the at least one processor to increase the transmit power of the reference channel by an up step in response to a codeword sent on the reference channel being detected as an erasure, and to decrease the transmit power of the reference channel by a down step in response to the codeword sent being detected as non-erased.

30. The apparatus of claim 29, wherein the up and down steps are selected based, at least in part, on a target erasure rate for the reference channel.

31. The apparatus of claim 22, wherein the reference channel carries channel quality indication (CQI) information.

32. A method comprising:
sending a first signal via a reference channel using a first radio technology;
sending a second signal via a second channel using a second radio technology;
adjusting transmit power of the reference channel, at least in part, to achieve a target level of performance for the reference channel;
adjusting transmit power of the second channel based, at least in part, on the transmit power of the reference channel;
adjusting a transmit power spectral density (PSD) delta based, at least in part, on one or more interference estimates;
determining a transmit PSD of the second channel based, at least in part, on the transmit PSD delta and a transmit PSD of the reference channel; and
setting the transmit power of the second channel, at least in part, to achieve the transmit PSD of the second channel.

33. The method of claim 32, wherein the first radio technology comprises Code Division Multiple Access (CDMA) and the second radio technology comprises Orthogonal Frequency Division Multiple Access (OFDMA).

34. The method of claim 32, wherein adjusting the transmit power of the reference channel comprises receiving one or more power control (PC) commands for the reference channel, and adjusting the transmit power of the reference channel based, at least in part, on the one or more PC commands.

35. The method of claim 32, wherein the adjusting the transmit power of the reference channel comprises receiving one or more erasure indications for one or more codewords sent on the reference channel, and adjusting the transmit power of the reference channel based, at least in part, on the one or more erasure indications.

36. The method of claim 32, wherein the adjusting the transmit power of the second channel comprises adjusting a delta based one or more interference estimates, and setting the transmit power of the second channel based, at least in part, on the transmit power of the reference channel and the delta.

37. An apparatus comprising:
means for sending a first signal via a reference channel using a first radio technology;
means for sending a second signal via a second channel using a second radio technology;
means for adjusting transmit power of the reference channel, at least in part, to achieve a target level of performance for the reference channel;
means for adjusting transmit power of the second channel based on the transmit power of the reference channel;
means for adjusting a transmit power spectral density (PSD) delta based, at least in part, on one or more interference estimates;
means for determining a transmit PSD of the second channel based, at least in part, on the transmit PSD delta and a transmit PSD of the reference channel; and
means for setting the transmit power of the second channel, at least in part, to achieve the transmit PSD of the second channel.

38. The apparatus of claim 37, wherein the first radio technology comprises Code Division Multiple Access (CDMA) and the second radio technology comprises Orthogonal Frequency Division Multiple Access (OFDMA).

39. The apparatus of claim 37, further comprising:
means for receiving one or more power control (PC) commands for the reference channel, and means for adjusting the transmit power of the reference channel based, at least in part, on the one or more PC commands.

40. The apparatus of claim 37, further comprising:
means for receiving one or more erasure indications for one or more codewords sent on the reference channel, and means for adjusting the transmit power of the reference channel based, at least in part, on the one or more erasure indications.

41. The apparatus of claim 37, further comprising:
means for adjusting a delta based, at least in part, on one or more interference estimates, and means for setting the transmit power of the second channel based, at least in part, on the transmit power of the reference channel and the delta.

42. An article comprising:
a processor readable media having instructions stored thereon executable by one or more processors to initiate:
adjustment of a transmit power of a reference channel, the reference channel comprising a first signal being sent using a first radio technology, the transmit power of the reference channel being adjusted, at least in part, to achieve a target level of performance for the reference channel;
adjustment of a transmit power of a second channel, the second channel comprising a second signal being sent using a second radio technology, the transmit power of the second channel being adjusted based, at least in part, on the transmit power of the reference channel;

adjustment of a transmit power spectral density (PSD) delta based, at least in part, on one or more interference estimates;
determination of a transmit PSD of the second channel based, at least in part, on the transmit PSD delta and a transmit PSD of the reference channel; and
adjustment of the transmit power of the second channel, at least in part, to achieve the transmit PSD of the second channel.

\* \* \* \* \*